(12) United States Patent  
Nakanishi et al.

(10) Patent No.: US 6,690,406 B2
(45) Date of Patent: Feb. 10, 2004

(54) IMAGE RECORDING DEVICE

(75) Inventors: Kanji Nakanishi, Saitama-ken (JP); Shintaro Washizu, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/854,941

(22) Filed: May 15, 2001

(65) Prior Publication Data

US 2002/0054774 A1 May 9, 2002

(30) Foreign Application Priority Data

May 15, 2000 (JP) ........................................ 2000-142175

(51) Int. Cl.⁷ ................................................ B41J 2/47
(52) U.S. Cl. ........................ 347/255; 347/156; 347/140
(58) Field of Search ................................ 347/240, 251, 347/228, 156, 157, 151, 155, 253, 255, 140; 399/33, 122, 184, 336, 191, 221, 203, 320; 430/97; 355/27, 30, 43, 45

(56) References Cited

U.S. PATENT DOCUMENTS

| 4,021,107 A | * | 5/1977 | Morita | 355/3 |
| 4,908,633 A | * | 3/1990 | Ohashi et al. | 346/107 |
| 4,939,536 A | * | 7/1990 | Matsumoto et al. | 355/27 |
| 5,162,841 A | * | 11/1992 | Terashita | 355/38 |
| 5,909,232 A | * | 6/1999 | Goto et al. | 347/187 |
| 6,281,920 B1 | * | 8/2001 | Agano | 347/188 |

FOREIGN PATENT DOCUMENTS

| JP | 59095570 A | * | 6/1984 | |
| JP | 4-267160 | | 9/1992 | B41J/2/325 |
| JP | 8-214114 | | 8/1996 | H04N/1/028 |

OTHER PUBLICATIONS

Patent Abstract of Japan 8–214114, Aug. 20, 1996.
Patent Abstract of Japan 4–267160, Sep. 22, 1992.

* cited by examiner

Primary Examiner—Stephen Meier
Assistant Examiner—Lam S Nguyen
(74) Attorney, Agent, or Firm—Sughrue Mion, PLLC

(57) ABSTRACT

A light and heat sensitive recording material passes through an accommodating section and a heat-development section and reaches an optical recording section. At the optical recording section, optical recording is effected, at the heat-development section, development is effected and at the photo-fixing section, fixing is effected upon the light and heat sensitive recording material. Finally, the light and heat sensitive recording material is discharged from a discharge section to the outside. At the photo-fixing section, white light from the optical recording section is used and irradiated onto the light and heat sensitive recording material. Thus, by using the same light source, a latent image can be appropriately recorded on the light and heat sensitive recording material and the heat-developed image can be reliably fixed.

21 Claims, 14 Drawing Sheets

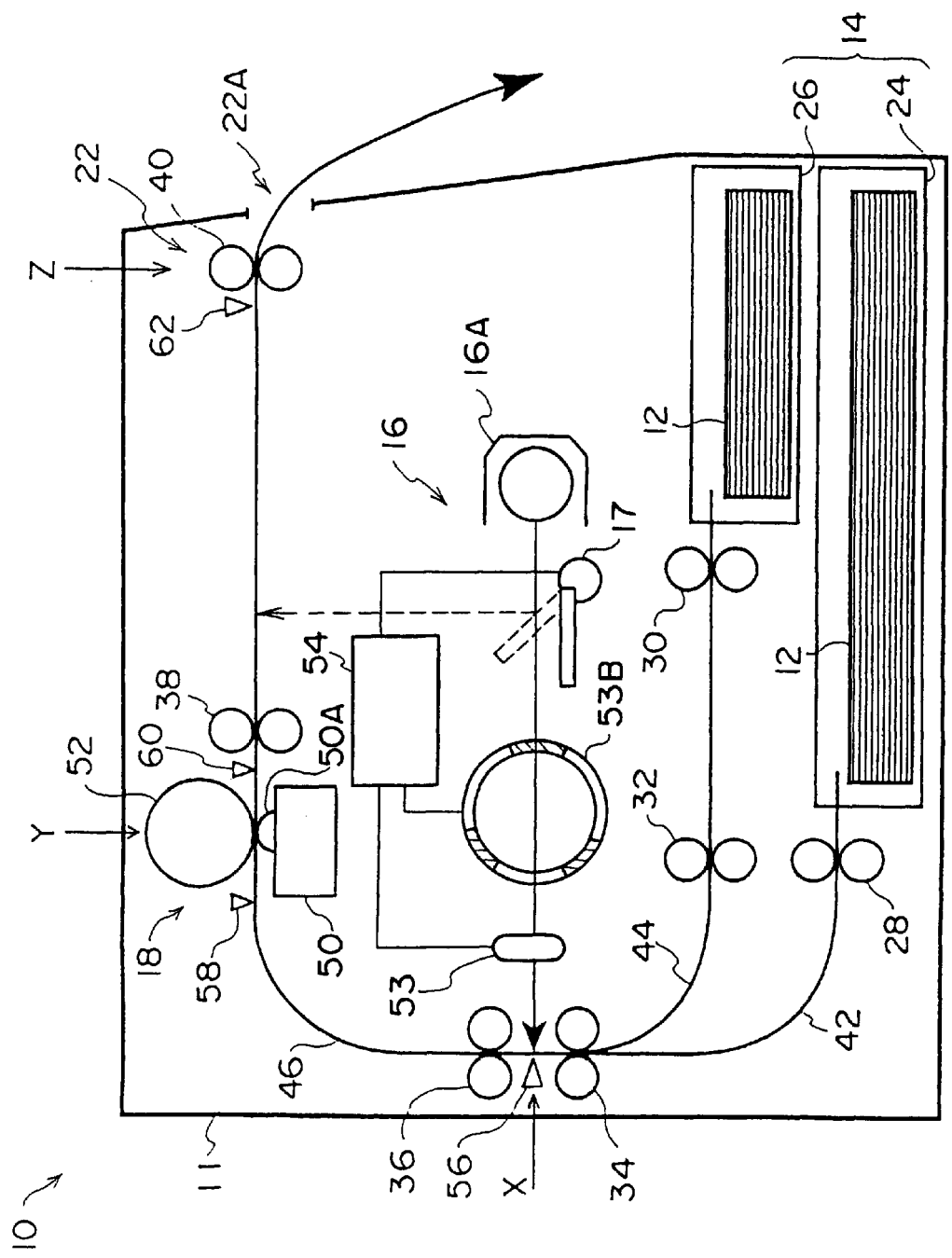

IMAGE RECORDING DEVICE

BACKGROUND OF THE INVENTION

1. Field of the Invention

The present invention relates to an image recording device and in particular, to an image recording device which utilizes a fixing device in which after a light and heat sensitive recording material is developed, the developed image is fixed by irradiation of light.

2. Description of the Related Art

In a conventional optical recording system such as silver halide photography, photographing is carried out using a photographic film such as a negative film or a positive film. Then, the photographic film is developed and a processing, for making a latent image visible, which latent image was formed by optically exposing the image information recorded on the developed photographic film with light, is carried out upon a recording material such as a printing paper or a plain paper, so that a print is obtained. In the following explanation, the photographic film refers to as a film which is subjected to development processing after a subject is photographed such that a negative image or a positive image thereon is made visible. Thus, in order to obtain a print from the photographic film, it is necessary to form an image using the image information recorded on the photographic film onto a recording material. Recently, the image information is made into an image using a recording material which does not require materials for development-and-fixation such as a processing solution, a toner or the like. Examples of such a recording material include a light and heat sensitive recording material in which a latent image is obtained by optically exposing the image information with light and the latent image is made visible by heat-development and then fixed.

Such a light and heat sensitive recording material is sequentially subjected to a recording processing for optically exposing the image information with light to record a latent image, a development processing for making visible (i.e., developing) the latent image by heat-processing and a fixing processing for fixing the developed image by irradiation of light. If this light and heat sensitive recording material is used, a color image can be obtained by superposing, on a support, monochrome light and heat sensitive recording layers which form colors such as yellow, magenta and cyan.

However, in order to obtain the color image, at least the recording processing and the fixing processing require the irradiation of light. In most cases, the energy to be applied, i.e., the exposure amount in the recording processing is different from that in the fixing processing. Thus, independent light sources are used for the respective processings, so that sufficient space for the light sources is required. As a result, the device becomes large.

SUMMARY OF THE INVENTION

In view of the aforementioned facts, an object of the present invention is to provide an image recording device which is compact and by which a light and heat sensitive recording material is appropriately recorded and fixed to obtain an image with high quality.

In order to accomplish the object of the present invention, in accordance with a first aspect of the present invention, there is provided a device for recording an image on light and heat sensitive recording material, the device comprises (a) a light source which irradiates light when operated; (b) a light separator which receives light irradiated from the light source, separates the light by color and irradiates color separated light towards light and heat sensitive recording material when disposed in the device, and forms a latent image on the recording material; and (c) a guide disposed for receiving light irradiated from the light source and which directs unseparated light towards the light and heat sensitive recording material and fixes an image formed thereon.

In accordance with a second aspect of the present invention, there is provided a device for recording an image on light and heat sensitive recording material, wherein the recording material includes layers sensitive to light color hues different from other layers, the device comprises (a) a light source which irradiates light comprising a mixture of color hues when operated; (b) optical recording apparatus including a light separator which separates light received from the light source into light consisting essentially of color hues corresponding to the light and heat sensitive recording layers, and which records a latent image on the recording material with the separated light; (c) a heat developer which subjects the light and heat sensitive recording material to heating and develops the latent image; and (d) fixing apparatus including a guide which guides unseparated light from the light source towards the light and heat sensitive recording material and fixes the developed image.

In accordance with a third aspect of the present invention, there is provided an image recording method comprising the steps of: (a) color separating light irradiated from a light source and then irradiating the light onto a light and heat sensitive recording material to thereby form a latent image on the recording material; (b) heating said light and heat sensitive recording material to thereby form a developed image from the latent image; (c) directing unseparated light from said light source with a guide onto the developed image to thereby fix the developed image.

In accordance with a fourth aspect of the present invention, there is provided a device for recording an image on light and heat sensitive recording material, the device comprises (a) a conveyor operable for conveying light and heat sensitive recording material to at least two different positions; (b) a light source which irradiates light when operated; (c) a light separator which receives light irradiated from the light source, separates the light by color and irradiates color separated light towards light and heat sensitive recording material when at one of the positions for forming a latent image thereon; and (d) a guide disposed for receiving light irradiated from the light source and directing the light towards light and heat sensitive recording material when at the other position for fixing an image thereon.

In the image recording device of the present invention, a light and heat sensitive recording material is exposed with light by an optical recording device, so that a latent image is formed. Then, the latent image is developed by a heat-development device. Thereafter, the developed image is fixed by a fixing device which irradiates light onto the image. The light and heat sensitive recording material includes light and heat sensitive recording layers. By being exposed with light and being heated, the exposed and unexposed portions of light and heat sensitive recording layers form color. There are a plurality of light and heat sensitive recording layers provided in order to form a color image. At a time of the exposure for recording a latent image, light which is separated by a light separating device and has color hues corresponding to the respective light and heat sensitive recording layers is irradiated. Thus, a latent image is recorded on each of the light and heat sensitive recording layers by the irradiation of light of the corresponding color hue. The latent image is developed by, for example, heating. The developed image is fixed by the fixing device. The fixing device irradiates white light, so that the developed image is fixed. The white light is guided to a photo-fixing position by a guide member. The white light which has not been separated into light having color hues corresponding to the light and heat sensitive recording layers can be easily guided so as to be used for the photo-fixing. Accordingly, a light source for the optical recording and a light source for the photo-fixing need not to be provided independently and a single light source can be used for both the optical recording and the photo-fixing.

The guide member is provided at a side of the white light source from which light is irradiated. The guide member is formed by a reflecting member which can switch a propagation direction of white light between a propagation direction at a time of the optical recording and a propagation direction at a time of the photo-fixing. Examples of the reflecting member include a mirror and a beam splitter. For example, at a time of the optical recording, white light is set to move directly to the position of exposure. Then, by inserting the reflecting member onto a path of the white light, the direction of the white light can be easily switched from the propagation direction at a time of the optical recording (i.e., the direction from the white light source to the position of exposure) to the propagation direction at a time of the photo-fixing (i.e., the reflecting direction).

The light separating device is provided at a side of the white light source from which light is irradiated, and includes an exposure amount controller which controls an exposure amount of the separated light. The optical recording device records a latent image with light obtained by separating white light. The amount of exposure of light irradiated onto the light and heat sensitive recording material may be controlled by the exposure amount controller. Thus, the exposure amount when a latent image is recorded can be appropriately controlled. The exposure amount controller may be formed by a transmitting member which separates and transmits light into light having color hues corresponding to the respective light and heat sensitive recording layers. An optical filter may be used as the transmitting member. For example, a rotating filter in which a liquid crystal shutter array and a plurality of optical filters are arranged in a rotating direction may be used.

BRIEF DESCRIPTION OF THE DRAWINGS

FIG. 4 is a block view showing the schematic structure of the image recording device relating to a second embodiment of the present invention.

DESCRIPTION OF THE PREFERRED EMBODIMENTS

Embodiments of the present invention will be described in detail hereinafter with reference to the drawings. In the present embodiments, the present invention is applied to an image recording device which records an image using a color light and heat sensitive recording material. In the present embodiments, as the color light and heat sensitive recording material, a color light and heat sensitive recording material, obtained by superposing, on a support, three monochrome light and heat sensitive recording layers which form colors such as yellow, magenta and cyan, is used.

(First Embodiment)

Figure 1:
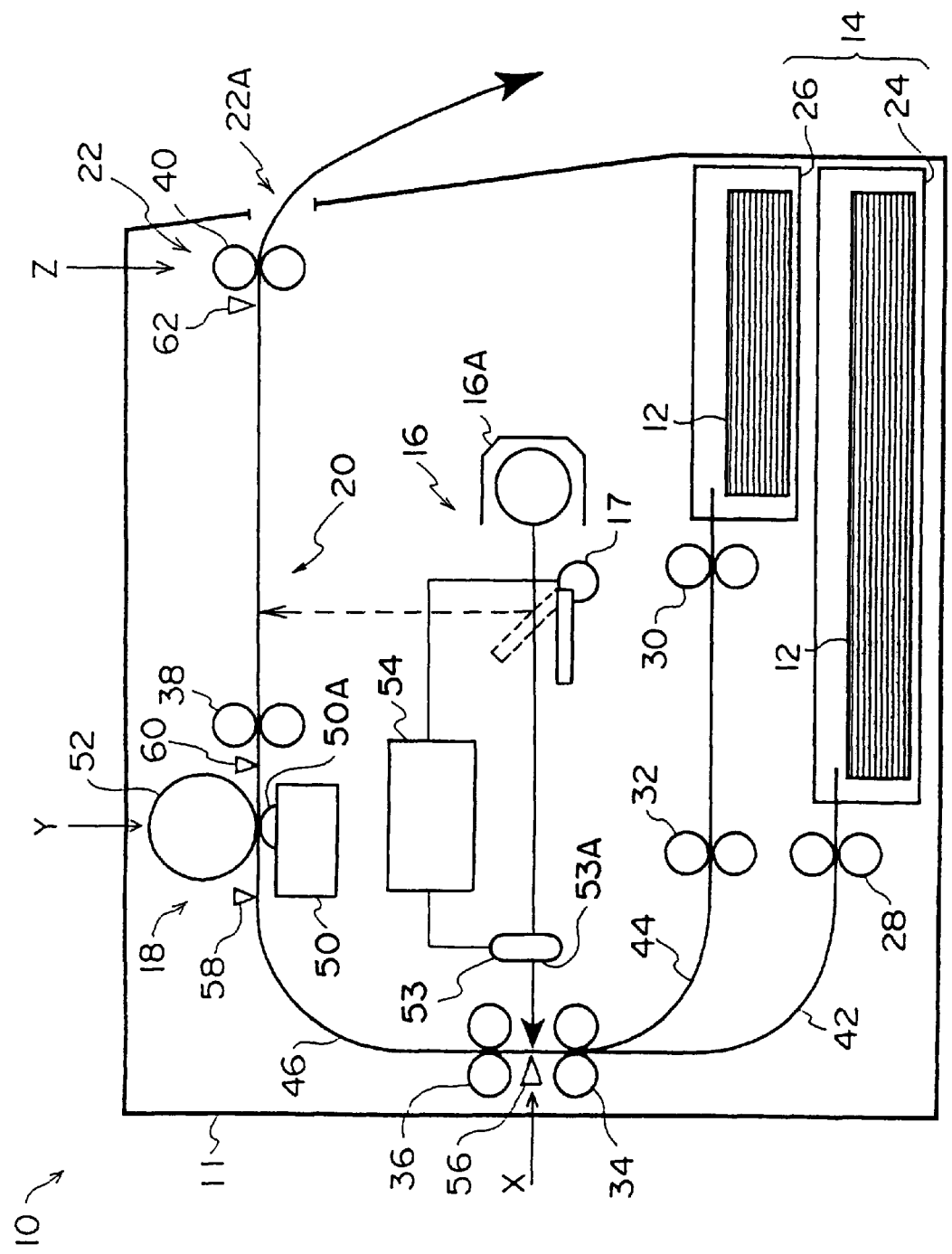
FIG. 1 is a block view showing the schematic structure of an image recording device relating to a first embodiment of the present invention.

FIG. 1 shows the schematic internal structure of an image recording device 10 which uses a light and heat sensitive recording material 12. As shown in FIG. 1, provided within a housing 11 of the image recording device 10 are an accommodating section 14 which accommodates the light and heat sensitive recording material 12 which is cut to a predetermined size, an optical recording section 16 which exposes the light and heat sensitive recording material 12 supplied from the accommodating section 14 with light to record a latent image, a heat-development section 18 which develops the latent image by heating, a photo-fixing section 20 which fixes the developed image by irradiation of light and a discharge section 22 which discharges the light and heat sensitive recording material 12 having the image recorded thereon. A discharge opening 22A for discharging the light and heat sensitive recording material 12 to the outside is provided at the discharge section 22.

The accommodating section 14 is provided at a lower portion of the housing 11 of the image recording device 10. In the present embodiments, accommodating cassettes 24 and 26 are provided in order to accommodate the light and heat sensitive recording materials 12 having different sizes (for example, A4 size and A6 size). A pair of conveying rollers 28 is disposed at the side of the accommodating cassette 24 of the accommodating section 14 where the light and heat sensitive recording material 12 exits, to nip and then convey the light and heat sensitive recording material 12. Conveying roller pairs 30 and 32 are disposed at the exit-side of the light and heat sensitive recording material 12 from the accommodating cassette 26.

Conveying roller pairs 34 and 36 are disposed in a vicinity of an exposure position X of the optical recording section 16. A pair of conveying rollers 38 is disposed between the heat-development section 18 and the photo-fixing section 20. A pair of conveying rollers 40 is provided in the discharge section 22.

A conveying path 42 for conveying the light and heat sensitive recording material 12 by the conveying roller pair 28 from the accommodating cassette 24 of the accommodating section 14 to the exposure position X of the optical recording section 16 is provided. A conveying path 46 for conveying the light and heat sensitive recording material 12 sequentially to the exposure position X of the optical recording section 16 by the conveying roller pairs 34 and 36, the heat-development section 18 and the photo-fixing section 20 by the conveying roller pair 38, and the discharge section 22 by the conveying roller pair 40 is provided. Thus, the light and heat sensitive recording material 12 accommodated in the accommodating cassette 24 passes through the accommodating section 14, the exposure position X of the optical recording section 16, the optical recording section 16, the heat-development section 18 and the photo-fixing section 20. Then the light and heat sensitive recording material 12 is discharged via the discharge section 22 to the outside of the housing 11 of the image recording device 10.

A conveying path 44 for conveying the light and heat sensitive recording material 12 by the conveying roller pairs 30 and 32 from the accommodating cassette 26 of the accommodating section 14 to the exposure position X of the optical recording section 16 is provided. The light and heat sensitive recording material 12 accommodated in the accommodating cassette 26 is conveyed by the conveying roller pairs 30 and 32 from the accommodating section 14 to the exposure position X of the optical recording section 16. The conveying path 44 joins the conveying path 46 at the conveying roller pairs 34 and 36.

These conveying roller pairs 28, 30, 32, 34, 36, 38 and 40 are connected to a conveyance driving section (not shown) and driven thereby.

The light and heat sensitive recording material 12 is accommodated within the accommodating cassettes 24 and 26 of the accommodating section 14 with the light and heat sensitive recording layer side thereof facing upward. At the accommodating section 14, the conveying rollers pair 28 nips the light and heat sensitive recording material 12 and rotates such that the light and heat sensitive recording material 12 is drawn from the accommodating cassette 24 within the accommodating section 14 with its light and heat sensitive recording layer side facing upward. Then, the light and heat sensitive recording material 12 is conveyed along the conveying path 42 and supplied to the optical recording section 16 which is provided at the downstream side in the conveying direction of the light and heat sensitive recording material 12, i.e., above the accommodating section 14.

At the optical recording section 16, a white light source unit 16A is used as a light source for recording a latent image. The white light source unit 16A is not shown, but is formed by a white light source which emits white light and an irradiating member such as a lens for irradiating the emitted white light toward the exposure position X. The white light irradiated from the white light source unit 16A may be irradiated in a planar or a linear manner. If white light is irradiated in a linear manner, when the conveying direction of the light and heat sensitive recording material 12 is the sub-scanning direction, light is irradiated so as to be parallel to the main scanning direction which is perpendicular to the sub-scanning direction. In the present embodiments, light is irradiated in a planar manner. The white light source unit 16A is connected to a controller 54.

As the light source for the white light source unit 16A, other than the white light source such as a fluorescent lamp, various light sources such as an LED, a halogen lamp and a cold cathode tube may be used.

A liquid crystal shutter array 53 is provided between the white light source unit 16A and the light and heat sensitive recording material 12. In the present embodiments, at the liquid crystal shutter array 53, transmission or blocking of light may be carried out for each of plural small areas which are arranged two-dimensionally in the longitudinal direction and in the transverse direction. The liquid crystal shutter array 53 includes micro color filters 53A of R, G and B. These filters convert the entered light into R, G and B light and emit the converted light. Each of the micro color filters 53A of R, G and B corresponds to each small area of the liquid crystal shutter array 53. Thus, by selecting a small area of the liquid crystal shutter array 53, a color of light irradiated onto the light and heat sensitive recording material 12 can be selected. Since white light can be transmitted or blocked for each small area, the method of exposing the light and heat sensitive recording material 12 with light can be freely controlled so as to be a linear exposure, a planar exposure, or one in which the order of exposure corresponds to an interlace, and the like.

Further, the liquid crystal shutter array 53 can also control an amount of transmitted light. Thus, the exposure amount of light irradiated onto the light and heat sensitive recording material 12 can also be controlled. That is, the intensity of transmitted light can be modulated.

A white light source unit 16A having the maximum intensity in the wavelength range of 300 to 1,100 nm may be used. The maximum amount of light irradiated onto the surface of the light and heat sensitive recording material 12 is preferably 0.01 to 50 $mJ/cm^2$ and more preferably 0.05 to 10 $mJ/cm^2$. If the maximum amount of irradiated light is larger than 50 $mJ/cm^2$, the exposure time becomes long, so that the convenience of the system is lost. Further, the light source becomes large, resulting in high costs of the system. Alternatively, in view of general sensitivity of the light and heat sensitive recording material 12, the maximum amount of irradiated light needs to be 0.01 $mJ/cm^2$ or more. Even if the light and heat sensitive recording material has high sensitivity, when the maximum amount of irradiated light is less than 0.01 $mJ/cm^2$, a light blocking device for blocking an interfering light is necessary, resulting in high costs of the system.

As shown in FIG. 1, the optical recording section 16 is disposed above the accommodating section 14. White light is emitted substantially horizontally from the white light source unit 16A of the optical recording section 16. The emitted white light is converted into a light beam of R, G or B by the liquid crystal shutter array 53 and the converted light beam is irradiated onto the light and heat sensitive recording material 12. The conveying roller pairs 34 and 36 are disposed in a vicinity of the exposure position X which is the center of the light and heat sensitive recording material 12 to be irradiated so that the light beam is irradiated therebetween. The light and heat sensitive recording material 12 is nipped by the conveying rollers 34 and 36, conveyed along the conveying path 46 and supplied to the heat-development section 18 which is disposed at the downstream side in the conveying direction of the light and heat sensitive recording material 12, i.e., above the optical recording section 16.

Figure 2:
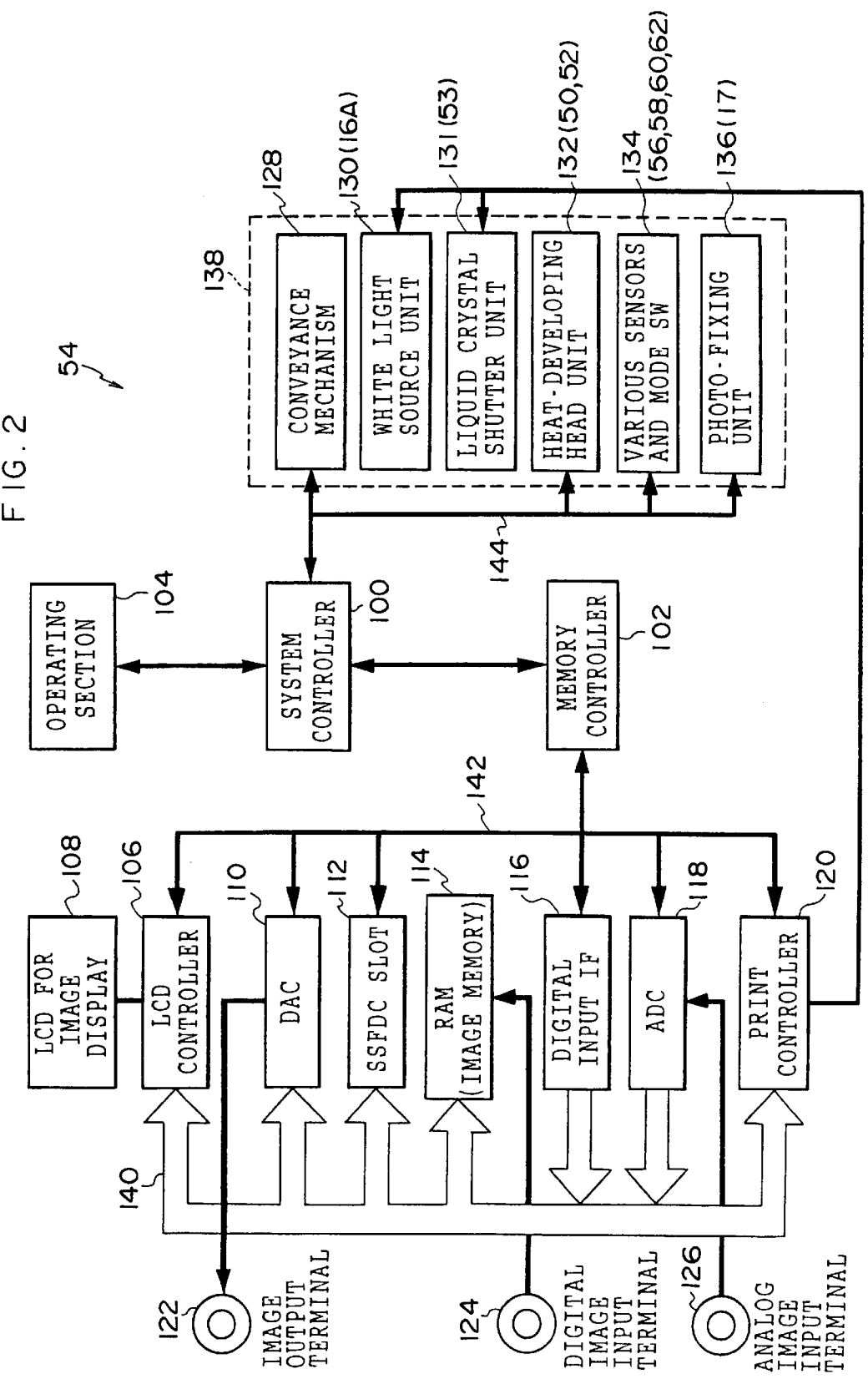
FIG. 2 is a block view showing the schematic structure of a controller included in the image recording device relating to the first embodiment of the present invention.

A position detecting sensor 56 is provided in a vicinity of the exposure position X. The position detecting sensor 56 is used for detecting the distal end of the light and heat sensitive recording material 12 conveyed from the accommodating section 14. An optical sensor or a magnetic sensor may be used as the position detecting sensor 56. The position detecting sensor 56 is connected to the controller 54 to be described later (FIG. 2).

The aforementioned polygon driving section, the conveyance driving section and the modulator driving section are included in the controller 54 which will be described later. The polygon driving section, the conveyance driving section and the modulator driving section are controlled so as to be synchronized with exposure effected in such a manner that image data subjected to the image processing is read from a RAM 114 which functions as an image memory and on the basis of the read image data, the light and heat sensitive recording material 12 is exposed.

The heat-development section 18 is disposed above the optical recording section 16. The heat-development section 18 includes a heat-sensitive recording head 50 which serves as a heating device for heating the light and heat sensitive recording layer side (i.e., the exposed surface side) of the light and heat sensitive recording material 12 and a platen roller 52 which opposes the heat-sensitive recording head 50 and nips the light and heat sensitive recording material 12 together with the heat-sensitive recording head 50. The platen roller 52 rotates in accordance with the conveyance of the light and heat sensitive recording material 12. The platen roller 52 nips the light and heat sensitive recording material 12 with the heat-sensitive recording head 50 so as to press the heat-sensitive recording head 50 against the light and heat sensitive recording material 12 at a fixed pressing force. The heat-sensitive recording head 50 and the platen roller 52 may press-contact with each other or may move away from each other. The heat-sensitive recording head 50 is pressed against the light and heat sensitive recording material 12 by being press-contacted, and this state is released by the recording head 50 being moved away.

In the present embodiments, the light and heat sensitive recording material 12 is pressed against the heat-sensitive recording head 50 by the platen roller 52 which rotates in accordance with the conveyance of the light and heat sensitive recording material 12, but the light and heat sensitive recording material 12 may be pressed against the heat-sensitive recording head 50 by a fixed member which does not rotate.

The heat-sensitive recording head 50 is formed by arranging a plurality of heating elements in one row. The heating energy can be adjusted for each heating element. The heating elements of the heat-sensitive recording head 50 is disposed on a glazed convex portion 50A provided at the side of the light and heat sensitive recording layer (i.e., at the side of the exposed surface) of the light and heat sensitive recording material 12. In the present embodiments, the radius of curvature of the distal end of the glazed convex portion 50A is 4 mm and the thickness thereof is 200 $\mu$m. The heating elements are disposed on the glazed convex portion 50A and thus the thermal efficiency and the efficiency of contact pressure can be improved. The preferable size of the heat-sensitive recording head 50 is such that the length of the heating elements in the conveying direction is 275 $\mu$m and the thickness of the glaze is 200 $\mu$m. The conveying speed of the light and heat sensitive recording material 12 is preferably 8 mm/sec.

At the heat-development section 18, the light and heat sensitive recording material 12 is heated to a predetermined temperature by the heat-sensitive recording head 50, so that a latent image recorded on the light and heat sensitive recording material 12 is developed. The heating temperature is a temperature higher than the developing temperature of the light and heat sensitive recording material 12 and preferably 50 to 300° C. and more preferably 120 to 250° C. If the heating temperature is low, the storability of the light-sensitive material before exposure significantly deteriorates. Thus, it is difficult to design the light and heat sensitive recording material. If the heating temperature is high, a support of the light and heat sensitive recording material deforms due to heat such that dimensional stability cannot be ensured. The heating temperature is controlled such that the variation band thereof with respect to a set temperature is within ±5° C. The light and heat sensitive recording material has the system that the permissible range with respect to temperature variations is relatively broad. If the variation range is within ±5° C., the performance of the light and heat sensitive recording material can be ensured.

Color formation in the heat-development depends on how much thermal energy is supplied to the light and heat sensitive recording material. That is, not only the temperature but also the heating time contributes to color formation. In the present embodiments, the heat-sensitive recording head 50 is controlled so as to apply the thermal energy for heating the light and heat sensitive recording material 12 at a predetermined temperature which is sufficient for color formation. The thermal energy is preferably in the range of 20 to 200 mJ/mm$^2$ and more specifically in the range of 120° C.×1 msec to 250° C.×500 msec. The thermal energy is a thermal energy which should be applied from the heat-sensitive recording head 50 for enabling preferable color formation of the light and heat sensitive recording material 12.

Position detecting sensors 58 and 60 are provided in vicinities of the heat-recording head 50 and the platen roller 52 which form the heat-development section 18. These position detecting sensors 58 and 60 are used for detecting the position of the heat-development or of the distal end of the light and heat sensitive recording material 12 conveyed from the optical recording section 16. An optical sensor or a magnetic sensor may be used as the position detecting sensor. Since the conveying speed of the light and heat sensitive recording material 12 is maintained at a fixed speed, the position detecting sensor is able to determine, on the basis of the time when the distal end of the light and heat sensitive recording material 12 passed through the position detecting sensors 58 and 60, which position on the light and heat sensitive recording material 12 is at what position of the conveying path 46. The position detecting sensors 58 and 60 are connected to the controller 54 which will be described later (FIG. 2). In the present embodiments, a predetermined position between the position that the heat-development ends and the position that the fixing starts is referred to as a position Y.

The conveying roller pair 38 is disposed at the conveying direction downstream side of the heat-development section 18. The light and heat sensitive recording material 12 subjected to the heat-development is nipped by the conveying roller pair 38, conveyed along the conveying path 46 and supplied to the photo-fixing section 20 disposed at the downstream side in the conveying direction of the light and heat sensitive recording material 12.

The photo-fixing section 20 is a section for fixing the developed image on the light and heat sensitive recording material 12 by irradiating the side having the image formed, of the light and heat sensitive recording material 12 subjected to development with light. In the present embodiments, white light from the white light source unit 16A used for recording a latent image is used as a light beam for fixing the developed image. Thus, a rotatable reflecting mirror 17 is provided in a vicinity of a light-exit of the white light source unit 16A. At a time of optical recording (i.e., at a time of recording a latent image), the reflecting mirror 17 is set at a retracted position (i.e., a position shown by the solid lines in FIG. 1) where an emitted light beam is directly irradiated onto the light and heat sensitive recording material 12 (the liquid crystal shutter array 53). When the photo-fixing is carried out, the reflecting mirror 17 is set at a position (i.e., a position shown by the dotted lines in FIG. 1) where the emitted light beam is reflected by the reflecting mirror 17 which position is toward the light and heat sensitive recording material 12 which is in the fixing position. The reflecting mirror 17 is connected to a driving device (not shown) and set to be either at the rotating position at a time of the optical recording or the rotating position at a time of the photo-fixing. Accordingly, at the photo-fixing section 20, white light is irradiated from the white light source unit 16A onto the light and heat sensitive recording layer side of the light and heat sensitive recording material 12, so that the developed image is fixed.

In this way, white light from the white light source unit 16A of the optical recording section 16 can be used for both the optical recording and the photo-fixing. A lamp for fixing is not necessary. As a result, saving of space can be accomplished.

At a time of fixing, the intensity of illumination of the white light source unit 16A onto the irradiated portion of the light and heat sensitive recording material 12 may be in any range as long as the light intensity necessary for fixing may be obtained, and is basically selected in accordance with characteristics of the light and heat sensitive recording material 12. The intensity of illumination is preferably in the range of 10,000 to 50,000,000 lux·s and more preferably in the range of 20,000 to 6,000,000 lux·s. If the intensity of illumination is less than 10,000 lux·s, the photo-fixability (the photo-decolorizability) may be insufficient. In a system which requires the intensity of illumination of 50,000,000 lux·s or more, the device becomes large and costs are high. Thus, a compact and inexpensive system cannot be obtained.

Thus, the amount of irradiated light of the white light source unit 16A is set to an amount of light at a time of fixing. When a latent image is recorded, the exposure amount is controlled by the liquid crystal shutter array 53. Thus, latent images are appropriately recorded on the respective light and heat sensitive recording layers of the light and heat sensitive recording material 12 and each color image subjected to the heat-development can be appropriately fixed.

The conveying roller pair 40 is disposed at the conveying direction downstream side of the photo-fixing section 20. The light and heat sensitive recording material 12 subjected to the photo-fixing is nipped by the conveying roller pair 40, conveyed along the conveying path 46 and supplied to the discharge section 22 at the downstream side in the conveying direction of the light and heat sensitive recording material. The light and heat sensitive recording material 12 is conveyed, i.e., discharged from the discharge opening 22A at the discharge section 22 to the outside of the device.

A position detecting sensor 62 is provided between the photo-fixing section 20 and the discharge section 22. The position detecting sensor 62 is used for detecting the position of a visualized portion of the light and heat sensitive recording material 12 conveyed from the photo-fixing section 20 at the distal end (or the back end) thereof. An optical sensor or a magnetic sensor may be used. That is, since the conveying speed of the light and heat sensitive recording material 12 is maintained at a fixed speed, the sensor is able to determine where the distal end or the back end of the light and heat sensitive recording material 12 is positioned on the conveying path 46, on the basis of the time when the distal end or the back end of the light and heat sensitive recording material 12 passed through the position detecting sensor 62. The position detecting sensor 62 is connected to the controller 54 which will be described later (FIG. 2). In the present embodiments, a predetermined position in the discharge section 22 is referred to as a position Z.

In accordance with the image recording device, all of the optical recording, the heat-development and the photo-fixing upon the light and heat sensitive recording material can be carried out within one device. In the image recording device, the development is effected by the heat-development and the developed image is fixed by the photo-fixing. Thus, the system is a perfect dry system free of processing solution. Further, since an image receiving member or the like is not necessary, waste products are not generated.

Next, a description will be given of the controller 54. As shown in FIG. 2, the controller 54 includes a system controller 100 which is formed by a microcomputer. The system controller 100 is connected to an operation section 104 such as a keyboard for operating the system controller 100. The system controller 100 is also connected to a mechanism section 138 which records an image onto the light and heat sensitive recording material 12 in the image recording device 10 of the first embodiment.

The mechanism section 138 is formed by a conveyance mechanism 128, a white light source unit 130, a liquid crystal shutter unit 131, a heat-developing head unit 132, a sensor unit 134 formed by various sensors and a mode SW and a photo-fixing sensor 136. The conveyance mechanism 128 is formed by the conveying roller pairs 28, 30, 32, 34, 36, 38 and 40 and a drive controlling section (not shown) for controlling the conveying roller pairs. The white light source unit 130 corresponds to the white light source unit 16A of the optical recording section 16. The liquid crystal shutter unit 131 corresponds to the liquid crystal shutter array 53. The heat-developing head unit 132 includes the heat-sensitive recording head 50 and the platen roller 52. The sensor unit 134 includes the position detecting sensors 56, 58, 60 and 62. The photo-fixing unit 136 functions in the photo-fixing section 20 and corresponds to the rotatable reflecting mirror 17 in the first embodiment. The conveyance mechanism 128, the heat-developing head unit 132, the sensor unit 134 formed by various sensors and the mode SW and the photo-fixing unit 136 contained in the mechanism section 138 are controlled in the system and thus, connected via a bus 144 to the system controller 100 so as to receive or pass on data or commands.

The system controller 100 is connected to a memory controller 102 which is formed by a microcomputer for controlling image data. The memory controller 102 is connected, via a bus 142, to an LCD controller 106 to which an LCD 108 for image display is connected, and a DAC 110, an SSFDC slot 112, a digital input IF 116, an ADC 118 and a print controller 120 are connected so as to receive or pass data or commands. The LCD controller 106, the DAC 110, the SSFDC slot 112, the digital input IF 116, the ADC 118 and the print controller 120 are connected, via a bus 140, to a RAM 114 which functions as an image memory for storing image data so as to receive or pass image data or commands.

The LCD 108 for image display is formed by a liquid crystal panel for displaying a color image. The LCD controller 106 is used for controlling the LCD 108 for image display. The LCD 108 for image display may be a CRT or any other display. When it is a CRT, the LCD controller 106 is a CRT controller. The DAC 110 is a converter for converting digital signals into analog signals. In the present embodiments, the DAC 110 is used for converting the digital image data into the analog image data. The DAC 110 is connected to an image output terminal 122 for outputting the image data to the outside of the device.

The SSFDC slot 112 is a controller for reading or writing the image data onto a recording medium such as a floppy disk or the like. Examples of the recording medium include a disk such as a CDR, an MD, an MO or a DVD and a magnetic tape such as a DAT or the like. A processing routine which will be described later may be stored in the recording medium which is loaded into the SSFDC slot 112.

The RAM 114 functions as an image memory and image data can be inputted from the outside of the device to the RAM 114. Thus, the RAM 114 is connected to a digital image input terminal 124. The digital input IF 116 is used to receive or pass a digital signal, in particular, a command. The ADC 118 is a converter for converting analog signals into digital signals. In the present embodiments, the ADC 118 is used for converting the analog image data into the digital image data. The ADC 118 is connected to an analog image input terminal 126 which enables analog inputting of the image data from the outside of the device. The print controller 120 is used for controlling the output of the image data for printing a color image, i.e., used for outputting the image data which is to be outputted to the liquid crystal shutter unit 131. The print controller 120 is connected to the white light source unit 130 and the liquid crystal shutter unit 131.

In the image recording device with the above-described structure relating to the present embodiments, the optical recording section 16 corresponds to an optical recording device, the heat-development section 18 corresponds to a heat-development device and the photo-fixing section 20 corresponds to a fixing device. The liquid crystal shutter array 53 corresponds to a light separating device and since it also controls the amount of light, it is also an exposure amount controlling device. The rotatable reflecting mirror 17 corresponds to a guide device.

Figure 3A:
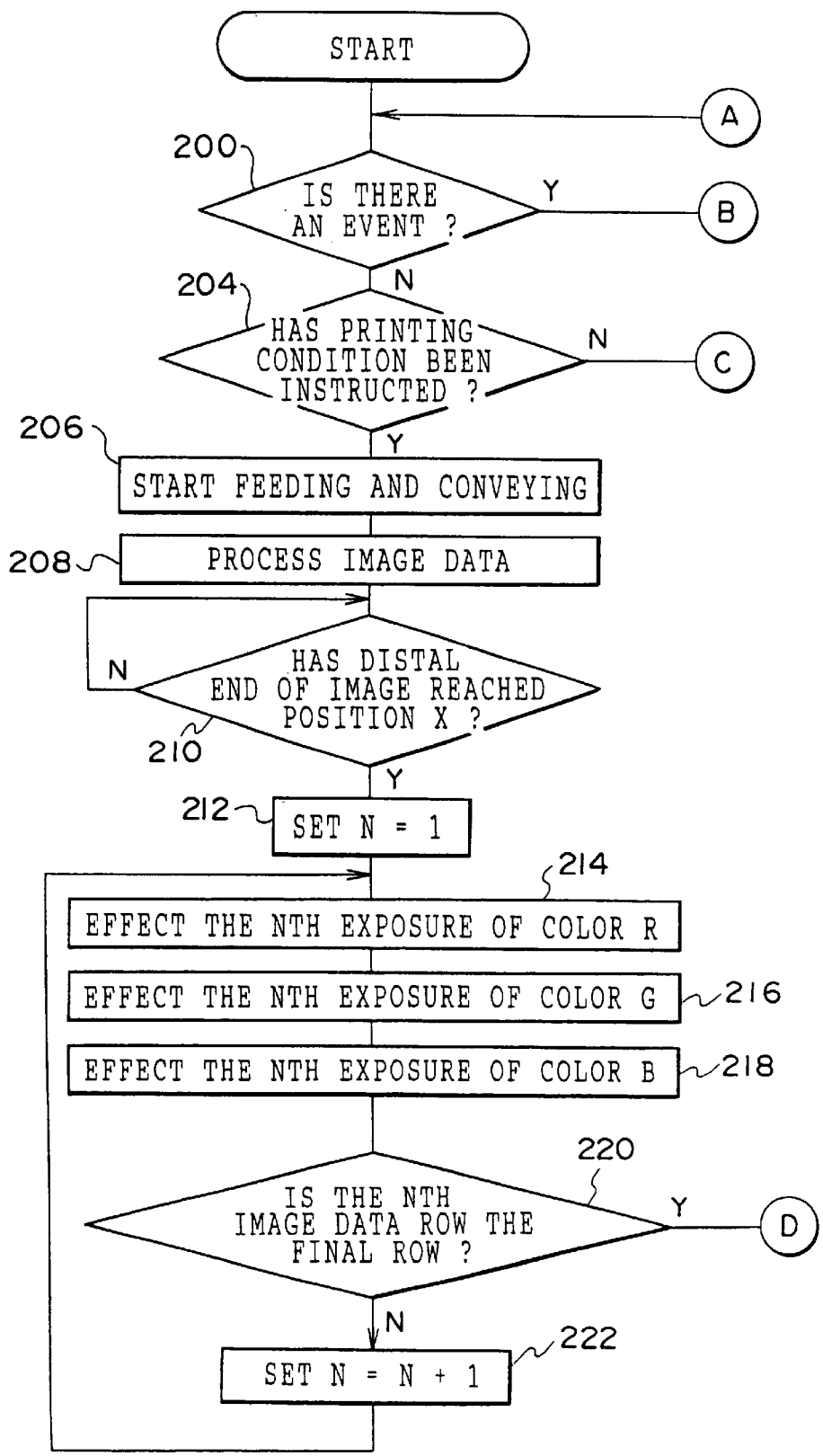
FIGS. 3A and 3B are flow charts showing a flow of processing in the image recording device relating to the embodiments of the present invention.
Figure 3B:
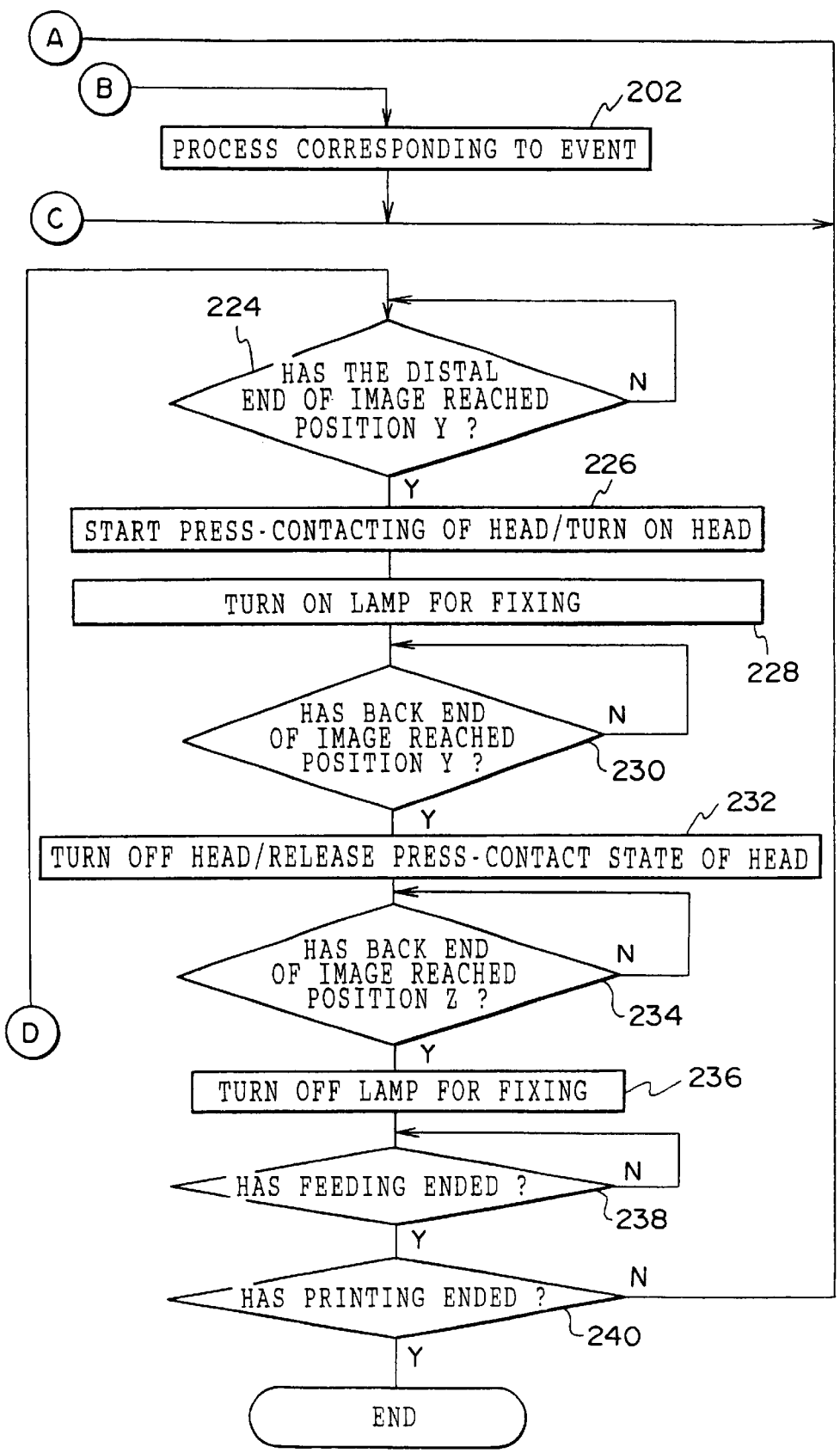

Next, an operation of the image recording device 10 of the present embodiments will be described. When electricity is applied to the image recording device 10, a processing routine shown in FIGS. 3A and 3B is carried out every predetermined period of time. When the processing routine shown in FIGS. 3A and 3B is carried out (i.e., when the processing starts), the reflecting mirror 17 is set at the position where the optical recording is carried out (a latent image is recorded), i.e., at the position where an emitted light beam is directly irradiated onto the light and heat sensitive recording material 12 (the position shown by the solid lines in FIG. 1).

In step 200, whether or not an event has occurred is determined by detecting the input state of the operation section 104. The event refers to a processing which relates to the image recording. Examples of the event include the confirmation of settings related to the device main body or the confirmation of settings related to print conditions. Examples of events which correspond to the confirmation of the settings related to the device main body include the confirmation of the lifetime of the heat-sensitive recording head 50, the confirmation of the lifetime of a lamp for fixing (the confirmation of the operating lifetime of the reflecting mirror), the confirmation of the lifetime of the white light source, the confirmation of the amount of paper remaining within the accommodating cassette. Examples of events corresponding to the confirmation of the settings related to printing conditions include the instruction for kinds of the light and heat sensitive recording material 12, the instruction for the number of prints, the instruction for printing, the instruction for color correction at a time of printing, the instruction for sizes, the instruction for trimming, the setting of print resolution, the reading of the image data and the output of the image data.

If the responsive step 200 is "Yes", the process proceeds to step 202. In step 202, the corresponding event is processed and then the process returns step 200. On the other hand, if the responsive step 200 is "No", the process proceeds to step 204. In step 204, a determination is made as to whether or not the printing condition (which is a basic condition) such as the number of prints has been instructed. If the printing condition has not been instructed, the step 204 determination is negative and the process returns step 200. If the printing condition has been instructed, the step 204 determination is affirmative and the process proceeds to step 206.

In step 206, the light and heat sensitive recording material 12 having a predetermined size is conveyed. That is, the light and heat sensitive recording material 12 is taken out of the accommodating cassette 24 or 26 of the accommodating section 14 in which the light and heat sensitive recording materials 12 with a predetermined size are accommodated. Then the conveyance of the light and heat sensitive recording material 12 toward the exposure position X of the optical recording section 16 starts. In step 208, an image data processing is carried out in the controller 54 upon the image data of an image to be printed. Then, the process proceeds to step 210.

In step 210, on the basis of a detected value of the position detecting sensor 56, whether or not the distal end position of the image has reached the position X is determined. This determination is made as follows. First, the distal end of the light and heat sensitive recording material 12 is detected by the position detecting sensor 56. Then, whether or not the light and heat sensitive recording material 12 has been conveyed by the exact distance from the distal end position to the printing position where an image is actually recorded is determined. The determination in step 210 is repeated until the distal end position of the image reaches the position X.

When the distal end position of the image reaches the position X, the step 210 determination is affirmative. In step 212, a variable N which represents the order of scanning of image exposure is set to an initial value (i.e., N=1). In step 214, the Nth exposure of the color R is effected, in step 216, the Nth exposure of the color G is effected and in step 218, the Nth exposure of the color B is effected. That is, in steps 214 to 218, white light is irradiated from the white light source unit 16A and the image data which has been image-processed is read from the RAM 114 which functions as the image memory. On the basis of the read image data, the liquid crystal shutter array 53 is controlled for each of the micro color filters of R, G and B. In this way, the light and heat sensitive recording material 12 is exposed.

In step 220, a determination is made as to whether or not the effected scanning is the last scanning, i.e., the back end of the image. If the step 220 determination is negative, it means that there is still exposure remaining to be carried out. Thus, in step 222, the variable N is incremented and then the process returns step 214. In step 214, the exposure is repeated. If the step 220 determination is affirmative, the process proceeds to step 224.

In step 224, on the basis of detected values of the position detecting sensors 58 and 60, whether or not the distal end position of the image has reached the position Y is determined. This determination is made as follows. First, the distal end of the light and heat sensitive recording material 12 is detected by the position detecting sensor 58 or both the position detecting sensors 58 and 60. Then, a determination is made as to whether the printing position of the light and heat sensitive recording material 12 where an image is to be actually recorded has been conveyed from the distal end position to the position Y where the heat-development is effected. The determination in step 224 is repeated until the distal end position of the image reaches the position Y.

If the distal end position of the image reaches the position Y, the step 224 response is affirmative. In step 226, the heat-sensitive recording head 50 press-contacts the platen roller 52 and the heat-sensitive recording head 50 is energized. Thus, the heat-development starts. Since the light and heat sensitive recording layer side (i.e., the exposed surface side) of the light and heat sensitive recording material 12 is heated by the heat-sensitive recording head 50, the efficiency of thermal transmission is improved. When heating is effected by the heat-sensitive recording head 50, the temperature of the light and heat sensitive recording layers of the light and heat sensitive recording material 12 is controlled so as to be in a predetermined desired temperature range (i.e., so as to be a predetermined desired thermal energy).

Energy which is applied to the light and heat sensitive recording material 12 due to heating by the heat-sensitive recording head 50 may be controlled using a supplying voltage or by changing an energizing time of the heat-sensitive recording head 50. If the applied energy is controlled by the supplying voltage, the applied energy can be increased by increasing the voltage or can be decreased by lowering the voltage. If the applied energy is controlled by the energizing time, the applied energy is increased by extending the energizing time or can be decreased by shortening the energizing time. Increasing or decreasing of the energizing time may be easily effected by modulating a pulse width. For example, an applied signal having a pulse width of 50% duty is set to be a standard signal and then, the duty is changed. Alternatively, by increasing or decreasing the number of pulses when a pulse signal having a fixed width is used, the applied energy can be increased or decreased.

Since the heat-sensitive recording head 50 is formed by a plurality of heating elements, each of the heating elements of the heat-sensitive recording head 50 can be controlled, i.e., the heating elements can be controlled separately. Thus, the temperature distribution of the heat-sensitive recording head 50 formed by a plurality of heating elements can be uniform or the distribution may be such that some heat elements have different temperatures from the others.

In step 228, the lamp for fixing is lit. Then, the heat-developed image on the light and heat sensitive recording material 12 conveyed to the photo-fixing section 20 is fixed. In the present embodiments, white light from the white light source unit 16A for recording a latent image is used for fixing. In step 228, the reflecting mirror 17 is rotated such that the white light from the white light source unit 16A is irradiated onto the position that the photo-fixing is carried out. That is, in order for a light beam of the white light emitted from the white light source unit 16A to be reflected by the reflecting mirror 17, the reflecting mirror 17 is set at the position (the position shown by the solid lines in FIG. 1) where the light beam is irradiated onto the light and heat sensitive recording material 12 positioned at the fixing position. In this way, by the white light from the white light source unit 16A for recording a latent image, the respective light and heat sensitive recording layers of the light and heat sensitive recording material 12 can be appropriately fixed for the respective color images subjected to the heat-development.

In step 230, on the basis of detected values of the position detecting sensors 58 and 60, whether or not the back end position of the image has reached the position Y is determined. This determination is made as follows. First, the back end of the light and heat sensitive recording material 12 is detected by either the position detecting sensor 58 or the position detecting sensors 58 and 60. Next, a determination is made as to whether or not the back end position of the image of the light and heat sensitive recording material 12 having the image actually recorded thereon has been conveyed from the back end position to the position Y. The determination in step 230 is repeated until the back end position of the image reaches the position Y.

When the back end position of the image reaches the position Y, the step 230 determination is affirmative. In step 232, the heat-sensitive recording head 50 is moved away from the platen roller 52. Thus, pressing of the heat-sensitive recording head 50 against the light and heat sensitive recording material 12 is released. In step 234, on the basis of a detected value of the position detecting sensor 62, whether or not the back end position of the image has reached the position Z is determined. This determination is made as follows. First, the back end of the light and heat sensitive recording material 12 is detected by the position detecting sensor 62. Then, a determination is made as to whether or not the back end position of the image of the light and heat sensitive recording material 12 having the image actually recorded thereon has been conveyed from the back end position to the position Z. The determination in step 234 is repeated until the back end position of the image reaches the position Z.

When the back end position of the image reaches the position Z, the step 234 determination is affirmative. Since the photo-fixing is not necessary at that time, in step 236, the lamp for fixing is turned off. In step 236, the white light source unit 16A which functions as the lamp for fixing at that time may be turned off or the reflecting mirror 17 may be rotated. That is, as described above, without using a lamp for fixing, white light from the white light source unit 16A is used for both recording a latent image and for fixing the image. Thus, in order to end the reflection of light beam of the white light emitted from the white light source unit 16A by the reflecting mirror 17, the reflecting mirror 17 is set at the position (the position shown by the solid lines in FIG. 1) where the emitted light beam is directly irradiated onto the light and heat sensitive recording material 12, which corresponds to turning off the lamp for fixing.

In step 238, whether or not feeding has ended is determined. This determination may be made on the basis of a detected value of a sensor provided at the discharge opening 22A. Alternatively, the determination may be made on the basis of a detected value of the position detecting sensor 62 which is such that an affirmative determination is made after a predetermined time has elapsed. When the feeding ends, the step 238 is affirmative. In step 240, a determination as to whether or not printing ends is made by determining whether or not printing of a predetermined number of prints specified in the printing conditions has ended. If there remains printing to be carried out, the step 240 is negative and the process returns step 200. Then, the above-described processings are repeated. When printing ends, the processing routine ends.

Since white light from the white light source unit 16A of the optical recording section 16 is used for both the optical recording and the photo-fixing, the lamp for fixing needs not to be provided, resulting in saving of space.

The white light source unit 16A is set so as to have an amount of light needed at a time of fixing. When a latent image is recorded, an exposure amount is controlled by the liquid crystal shutter array 53 such that an optimized optical recording is effected. Further, the white light is switched to being used for fixing, and thus, latent images of the respective light and heat sensitive recording layers of the light and heat sensitive recording material can be appropriately recorded. Further, the heat-developed color images can be appropriately fixed.

In the first embodiment, a description has been given of a case of using the liquid crystal shutter array 53 having micro color filters 53A of R, G and B. Instead of the micro color filters 53A, stripe filters of R, G and B may be used. In this case, a plurality of liquid crystal shutter arrays may be provided separately for each of the stripe filters of R, G and B. The R, G, B stripe filters may be arranged in a two dimensional liquid crystal shutter array.

(Second Embodiment)

In the embodiment described above, a description has been given of a case where white light is converted into light beam of R, G and B by micro color filters of a liquid crystal shutter array at a time of recording a latent image. In a second embodiment, the white light is converted into light beam of R, G and B by a rotating cylindrical filter. Since the second embodiment has the same structure as that of the first embodiment, the same portions as those of the first embodiment are denoted by the same reference numerals and detailed descriptions thereof will be omitted.

As shown in FIG. 4, a rotating cylindrical filter 53B is provided between the liquid crystal shutter array 53 and the white light source unit 16A. In the image recording device of the second embodiment, entered white light is converted to R, G and B light by the rotating cylindrical filter 53B and then the converted light is emitted. Thus, R, G and B light is entered into the liquid crystal shutter array 53 in accordance with the rotating angle. Each of the R, G and B lights is transmitted or blocked by the liquid crystal shutter array 53 for each of small areas arranged two-dimensionally in the longitudinal direction and the transverse direction.

At the optical recording section 16 of the second embodiment, light from the white light source unit 16A is converted into R, G and B light by filters provided in the rotating cylindrical filter 53B. Then the converted light is irradiated in a planar manner. That is, irradiations of the R light, the G light and the B light are sequentially effected (i.e., the irradiation is repeated three times) in a planar manner, so that an image is formed.

Figure 5:
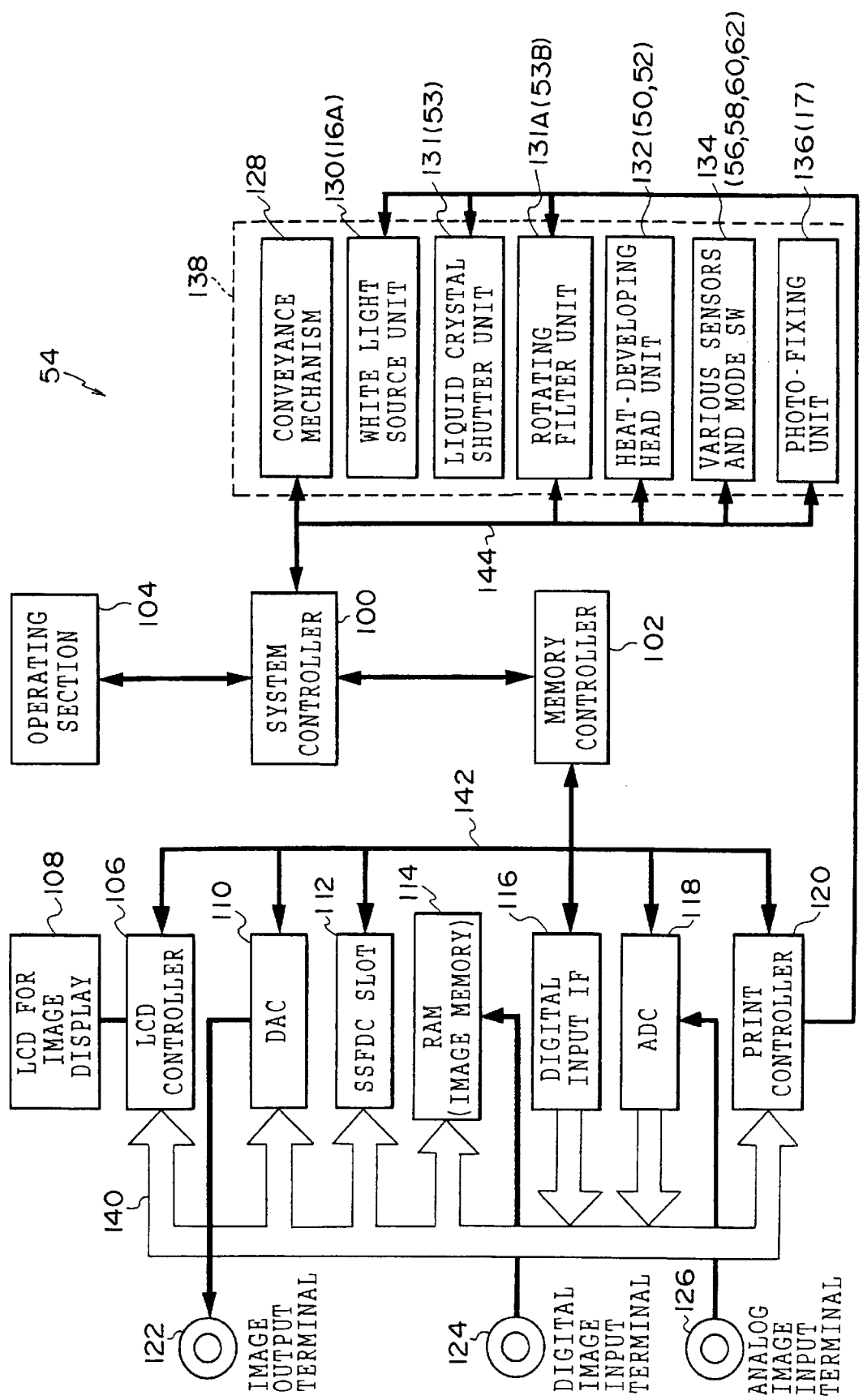
FIG. 5 is a block view showing the schematic structure of the controller included in the image recording device relating to the second embodiment of the present invention.

As shown in FIG. 5, in the controller 54 of the second embodiment, a rotating filter unit 131A is included in the mechanism section 138. That is, instead of controlling for each color at the liquid crystal shutter unit 131, control is effected by rotation of the rotating filter unit 131A. The rotating filter unit 131A corresponds to the rotating cylindrical filter 53B. The print controller 120 is used for controlling the output of image data for printing a color image, i.e., for outputting the image data to be passed to the liquid crystal shutter unit 131. The print controller 120 is connected to the white light source unit 130, the liquid crystal shutter unit 131 and the rotating filter unit 131A.

Figure 6A:
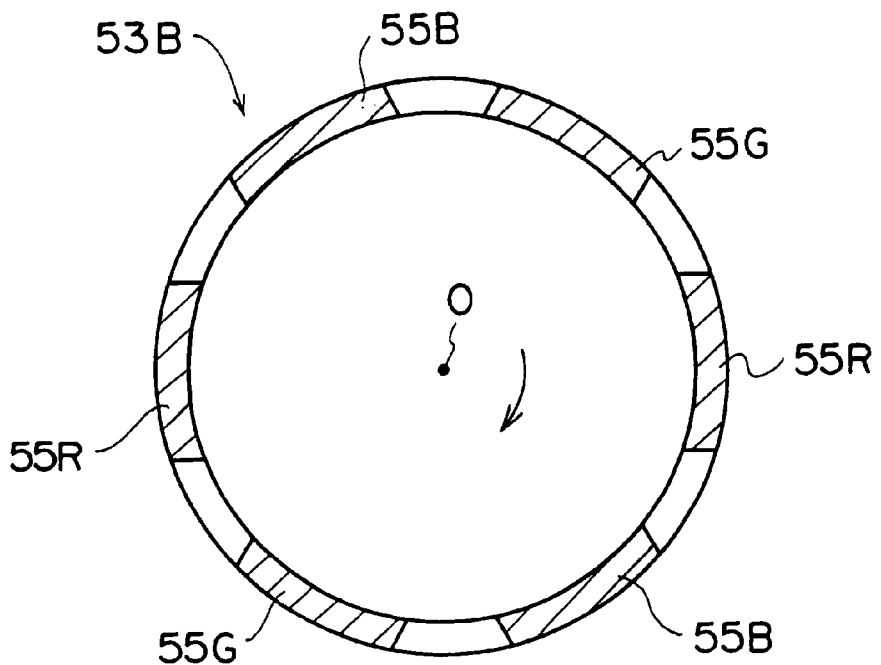
FIGS. 6A and 6B are imaginary views showing the schematic structure of a rotating cylindrical filter included in the image recording device relating to the second embodiment of the present invention.
Figure 6B:
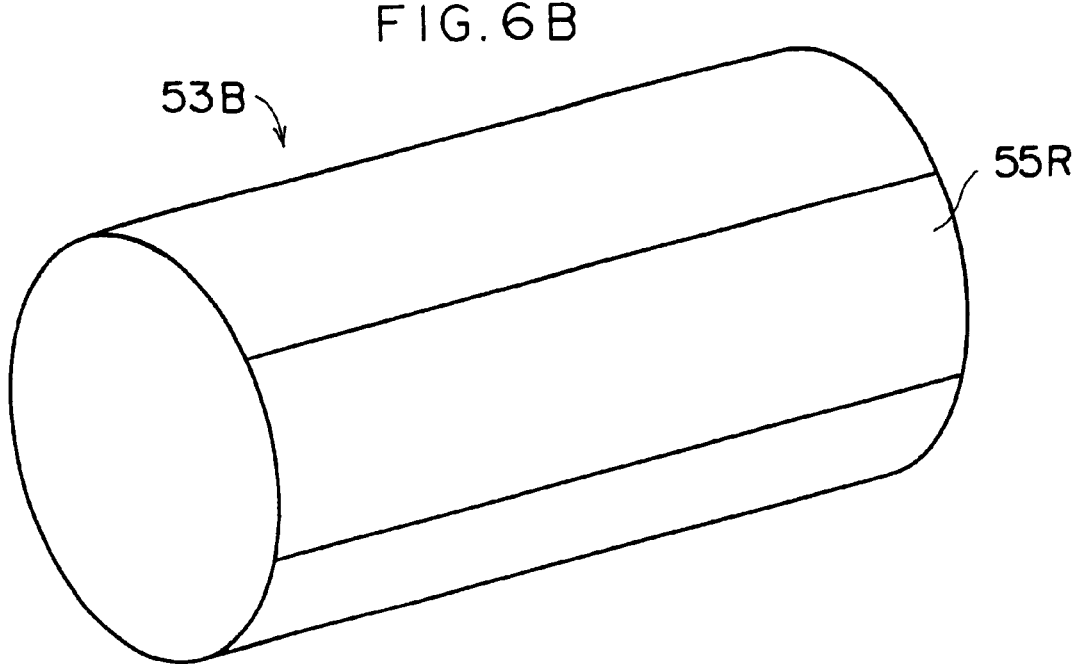

As shown in FIG. 6B, the rotating cylindrical filter 53B is formed in a cylindrical shape. R, G, B optical filters are provided at the circumferential surface of the filter. Specifically, as shown in FIG. 6A, the R, G, B optical filter sets 55R, 55G and 55B, each of which is formed by two filters, are provided so as to be positioned at points of symmetry about a central axis O of the rotating cylindrical filter 53B. By rotating the rotating cylindrical filter 53B, light irradiated from the white light source unit 16A to the central axis O of the rotating cylindrical filter 53B transmits through one of the R, G, B optical filter sets 55R, 55G and 55B. Each of the R, G, B optical filter sets 55R, 55G ad 55B may be formed by a single filter. In this case, as shown in FIG. 4, in each set of the filters, an opening or a transmission glass may be provided at positions which are points of symmetry about the central axis O of the rotating cylindrical filter 53B.

In this way, in the second embodiment, white light is converted into light beams of R, G and B by the rotating cylindrical filter. Thus, a liquid crystal shutter array with a simple structure can be obtained without providing color filters at the liquid crystal shutter array.

(Third Embodiment)

The optical recording section 16 of a third embodiment includes a white light source corresponding to R, G and B colors, and a micromirror array which includes multiple small mirrors whose reflecting angles can be adjusted. Using the white light source and the micromirror array, R, G, B light obtained by color-separating white light from the white light source is exposed in a planar manner by adjusting the reflecting angles of the small mirrors of the micromirror array on the basis of image signal. The third embodiment has substantially the same structure as those of the first and second embodiments. Thus, the same portions as in the first and second embodiments are denoted by the same reference numerals and detailed descriptions thereof will be omitted.

Figure 7:
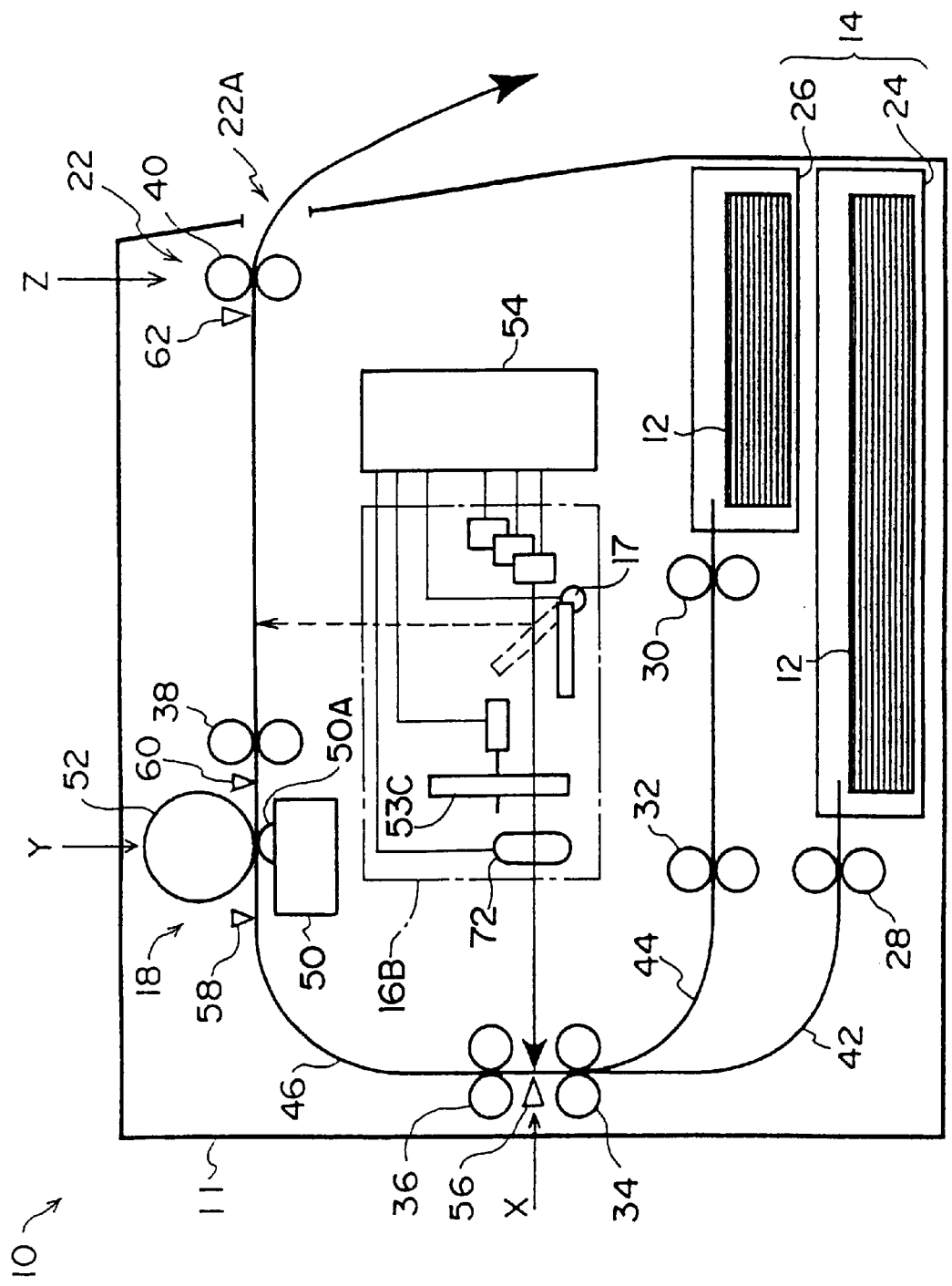
FIG. 7 is a block view showing the schematic structure of the image recording device relating to a third embodiment of the present invention.

As shown in FIG. 7, in the third embodiment, the optical recording section 16 has the light source unit 16B for effecting the exposure. The light source unit 16B is connected to the controller 54. The light source unit 16B of the third embodiment is provided with a rotating filter 53C in a vicinity of the light and heat sensitive recording material 12. In the image recording device of the third embodiment, entered white light is converted into R, G and B light by the rotating filter 53C and then the converted light is emitted.

Figure 8:
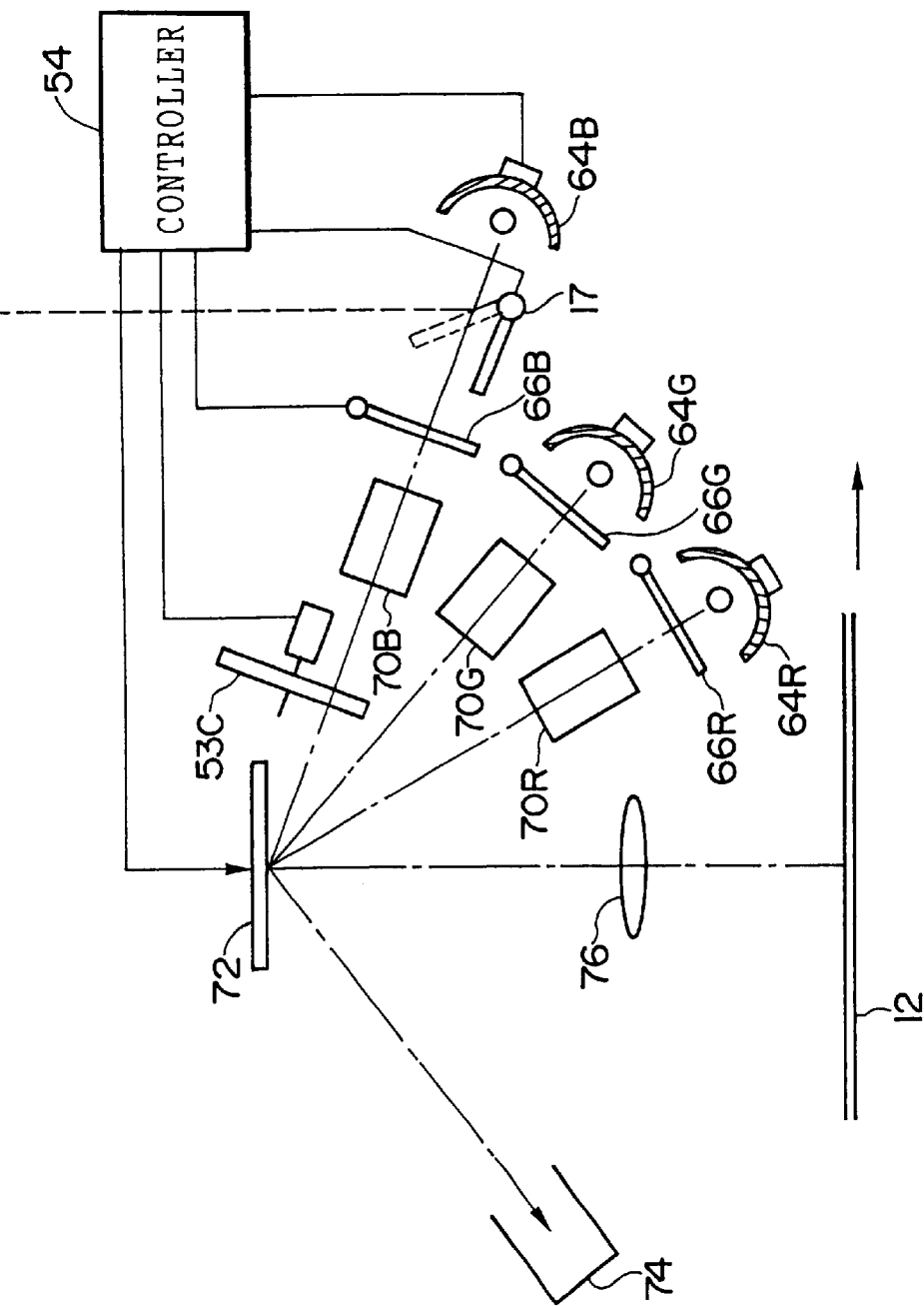
FIG. 8 is a block view showing the schematic structure of an optical recording section included in the image recording device relating to the third embodiment of the present invention.

As shown in FIG. 8, the light source unit 16B of the optical recording section 16 has a light source 64B for B light which is formed by a halogen lamp and a reflector. A rotatable reflecting mirror 17 is provided at a side of the light source 64B at which light exits. During the optical recording (i.e., during recording a latent image), the reflecting mirror 17 is set at the position (shown by the solid lines in FIG. 8) where emitted white light is directly irradiated onto the light and heat sensitive recording material 12. During the photo-fixing, the reflecting mirror 17 is set at the position (the position shown by the dotted lines in FIG. 8) where emitted white light is reflected by the reflecting mirror 17 and then irradiated onto the light and heat sensitive recording material 12 positioned at the fixing position. The reflecting mirror 17 is connected to a driving device (not shown) and set to either the rotating position at a time of the optical recording or the rotating position at a time of the photo-fixing. Thus, in the photo-fixing section 20, white light from the light source 64B is irradiated onto the light and heat sensitive recording material 12 from the light and heat sensitive recording layer side thereof. Then, the developed image is fixed.

A light adjusting filter 66B having C, M and Y cutting filters is disposed at a side of the light source 64B from which light exits and at the downstream side of the reflecting mirror 17. Each cutting filter can be moved independently, by a driver provided so as to correspond to each filter, in a direction such that the cutting filter is inserted into an optical path or in a direction such that it is moved away from the optical path. The drivers of the light adjusting filter 66B are connected respectively to the controller 54.

A diffusing box 70B for diffusing light being transmitted though the box is disposed at a side of the light adjusting filter 66B from which light exits. The rotating filter 53C which is formed by a turret having R, G and B color separation filters are disposed at the side of the diffusing box 70B from which light exits. The rotating filter 53C is rotated by a driver (not shown) connected to the controller 54 and is structured such that either color separation filter is inserted onto the optical path.

A micromirror array 72 which reflects lights of the respective colors which have been transmitted through the color separation filters is disposed at a light-transmitting side of the rotating filter 53C.

Figure 12:
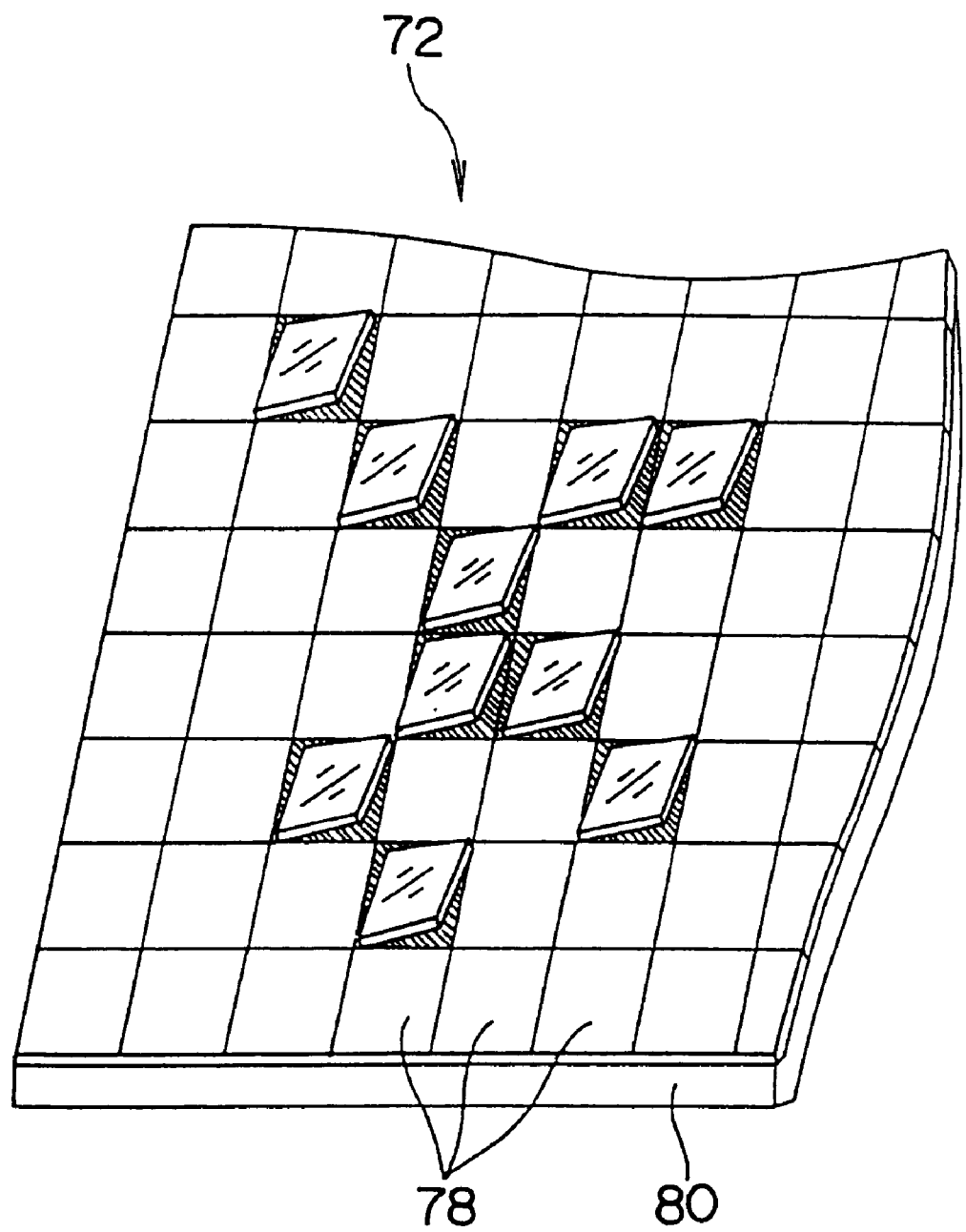
FIG. 12 is a partially-enlarged view showing the structure of a part of a micromirror array.
Figure 13A:
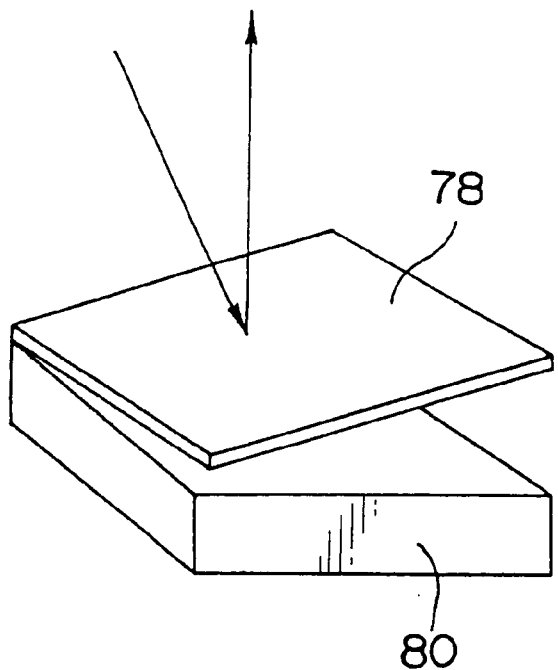
FIGS. 13A and 13B are explanatory views for explaining an operation of micromirrors forming the micromirror array.
Figure 13B:
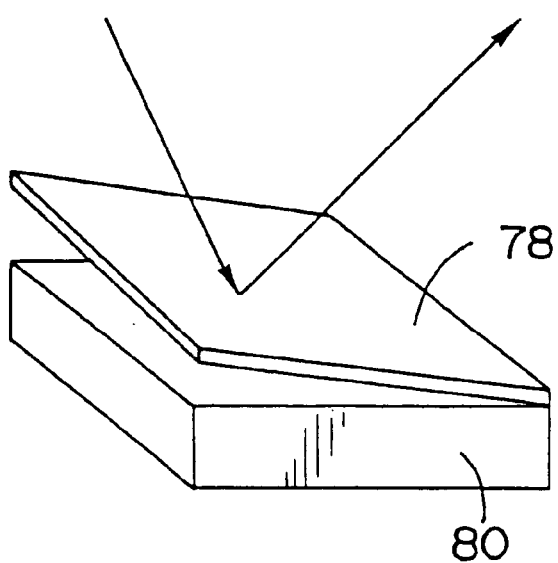

As shown in FIG. 12, the micromirror array 72 is formed by arranging small mirrors (micromirrors) 78 supported by supports on an SRAM cell (a memory cell) 80. That is, the micromirror array 72 is a mirror device structured by arranging multiple pixels (hundreds of thousands to millions pixels) in a grid shape. Each pixel will be described. As shown in FIGS. 13A and 13B, the micromirror 78 supported by a support is provided on the top of the pixel. Aluminum is deposited on the surface of the micromirror 78. The reflectance of the micromirror 78 is at least 90%. An SRAM cell 80 of CMOS of a silicon gate manufactured in an ordinary manufacturing line of semiconductor memories is disposed via the support such as a hinge or a yoke immediately under the micromirror 78. The micromirror array 72 is formed in a monolithic manner (i.e., is integrally formed)

At the micromirror array 72, when digital signal is written into the SRAM, the micromirror 78 supported by a support tilts ±α° (for example, ±10°) with respect to the substrate side at which the micromirror array 72 is disposed about a diagonal line. Thus, the direction of reflecting light is changed. That is, by turning on or off each of the micromirrors 78, each micromirror 78 tilts ±α° such that the micromirror array 72 can be used as an optical switch. FIG. 13A shows a state in which the micromirror 78 is turned on and is tilted at +α°, and FIG. 13B shows a state in which the micromirror 78 is turned off and is tilted at −α°.

On the basis of the image signal, the tilt of each micromirror 78 of each pixel in the micromirror array 72 is controlled as shown in FIG. 12. Thus, light entered in the micromirror array 72 is reflected in the tilt directions of micromirrors 78. FIG. 12 is a partially-enlarged view of the micromirror array 72 and shows a state in which the micromirrors 78 are tilted at +α° or −α°.

Control for turning on or off the micromirrors 78 is effected by the controller 54 which is connected to the micromirror array 72. A condensing lens 76 which focuses the light reflected by the micromirror array 72 onto the recording surface of the light and heat sensitive recording material 12 is disposed on the optical axis of the light reflected by the micromirror array 72.

At the optical recording section 16, the light adjusting filter 66B is adjusted, and on the basis of the inputted image signal, an amount of exposure is computed by the controller 54 and on the basis of the computed exposure amount, each of the micromirrors 78 is turned on or off. At this time, the period for which the micromirror 78 is on becomes long as the exposure amount increases. Light which is outputted from the light source 64B and enters, via the light adjusting filter 66B and the diffusing box 70B, the micromirror array 72 is reflected by the micromirror array 72 in the direction toward the light and heat sensitive recording material 12 if the micromirrors 78 are turned on, or in the direction toward the light absorber 74 if the micromirrors 78 are turned off. Light which is reflected toward the light and heat sensitive recording material 12 is converged by the condensing lens 76 onto the recording surface of the light and heat sensitive recording material 12. As a result, the light and heat sensitive recording material 12 is exposed with light from the recording layer side thereof, so that a latent image is recorded on the light and heat sensitive recording material 12.

At this time, the rotating filter 53C is rotated, so that the color separation filter for the color R is disposed. On the basis of the image signal of the color R, the micromirror array 72 is turned on or off such that exposure by the R light is effected. Next, the color separation filter for the color G is disposed and the exposure by the G light is effected. Finally, the color separation filter for the color B is disposed and the exposure by the B light is effected. In this way, the exposure by R, G, B lights can be effected.

Figure 9:
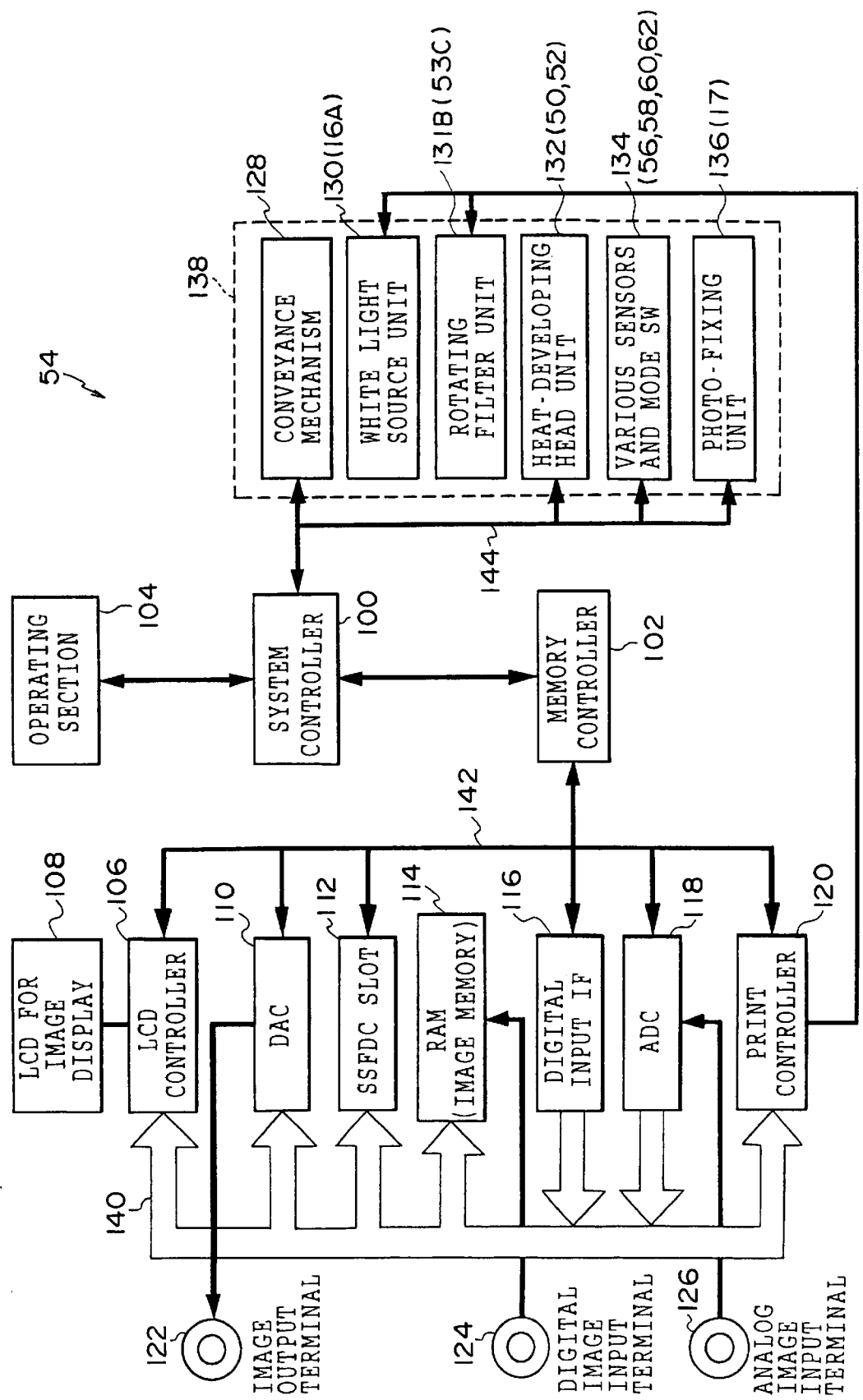
FIG. 9 is a block view showing the schematic structure of the controller included in the image recording device relating to the third embodiment of the present invention.

As shown in FIG. 9, in the controller 54 of the third embodiment, the mechanism section 138 includes a rotating filter unit 131B. This rotating filter unit 131B corresponds to the rotating filter 53C. The rotating filter unit 131B also includes a structure corresponding to the micromirror array 72. The print controller 120 is used for controlling the output of image data for printing a color image, i.e., for outputting the image data which is passed to the white light source unit 130. The print controller 120 is connected to the white light source unit 130 and the rotating filter unit 131B.

Figure 10:
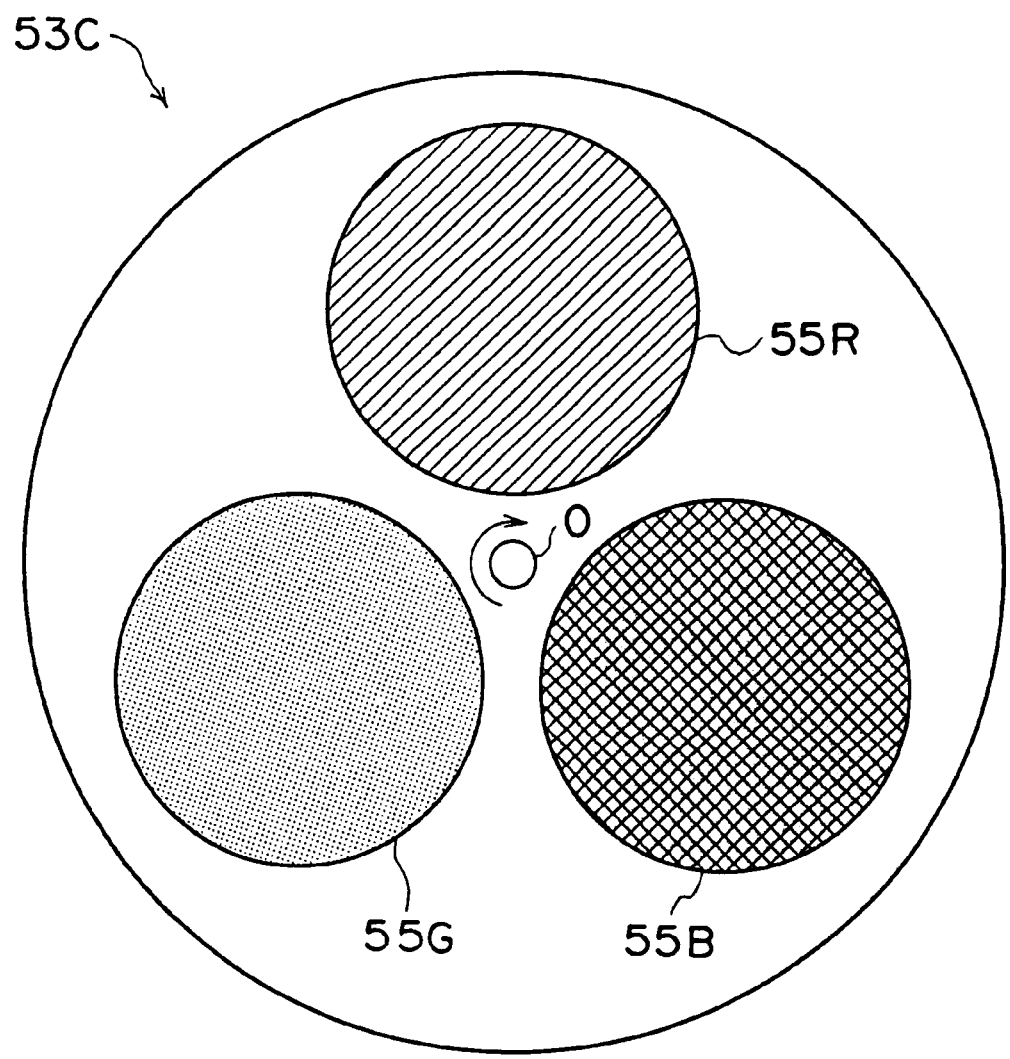
FIG. 10 is an imaginary view showing the schematic structure of the rotating cylindrical filter included in the image recording device relating to the third embodiment of the present invention.
Figure 11:
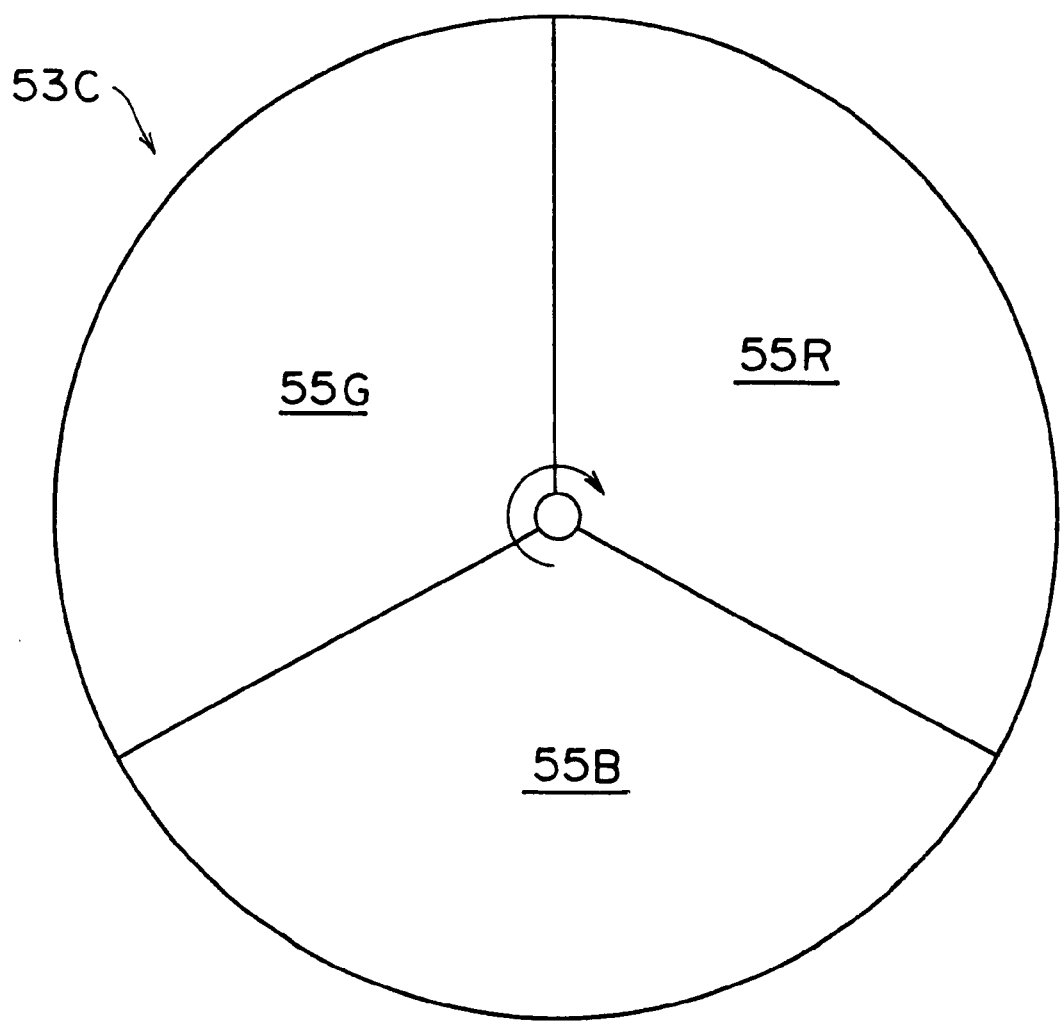
FIG. 11 is a structural view showing another example of the rotating cylindrical filter.

As shown in FIG. 10, the rotating filter 53C is formed in a disc shape. R, G, B optical filters are provided along the rotating direction of the filter 53C. Specifically, the R, G, B optical filters 55R, 55G and 55B are provided respectively at equal angular positions with respect to the central axis O. Thus, by rotating the rotating filter 53C, light is transmitted by one of the R, G, B optical filters 55R, 55G and 55B. The shape of the optical filter provided in the rotating filter 53C is not limited to a circular shape, and for example, as shown in FIG. 11, the optical filter may be formed by dividing the rotating filter 53C into the respective color regions.

In the third embodiment, white light from the white light source unit included in the optical recording section 16 may be used for both optical recording and photo-fixing, so that a lamp for fixing is not necessary. As a result, reduction in space can be accomplished. A light beam is controlled by the white light source unit and white light is converted into R, G or B light by the rotating filter. Thus, the liquid crystal shutter array does not need to be provided, so that an image recording device having a simple structure can be obtained.

As another example, as shown in FIG. 8, in the third embodiment, the light source unit 16B includes a light source 64G for G light which is formed by a halogen lamp and a reflector. The light adjusting filter 66G having cutting filters of C, M and Y is disposed at a side of the light source 64B from which light is irradiated. In this case, the diffusing box 70B for diffusing transmitting light is disposed at a side of the light adjusting filter 66G at which light exits. The micromirror array 72 is disposed at a side of the diffusing box 70B at which light exits. Similarly, the light source unit 16B includes a light source 64R for R light which is formed by a halogen lamp and a reflector. The light adjusting filter 66R is disposed at a side of the light source 64R from which light is irradiated. The diffusing box 70R for diffusing transmitted light is disposed at a side of the light adjusting filter 66R from which light exits.

Filters corresponding to the color separation filters of the rotating filter which separate light into the color G and the color R are provided at the sides of the diffusing boxes 70G and 70R from which light exits. The rotating filter at the side of the diffusing box 70B from which light exits is fixed to filter the color B. Thus, lights of R, G and B are irradiated onto the micromirror array 72.

Accordingly, R, G and B lights can be irradiated at the same time, and exposure by lights of three colors can be effected simultaneously. A rotatable reflecting mirror may be provided at a side of the light sources 64G or 64R from which light is irradited. By providing the reflecting mirror at one of the light sources 64G and 64R, an amount of white light for fixing can be increased and adjusted.

Micromirror arrays may be independently provided so as to correspond to the light source 64G for G light and the light source 64R for R light. In this way, white light emitted from the light sources 64R, 64G and 64B is separated into R, G and B light components by the color separation filters. Then, the separated R, G, B light components are reflected by the micromirror arrays such that the separated light components are irradiated in a planar manner onto the light and heat sensitive recording material 12.

If white light from the white light source unit 16 is used for the photo-fixing, an exposure amount is preferably controlled in accordance with sensitivities of the light and heat sensitive recording layers of the light and heat sensitive recording material 12. By controlling the exposure amount in such a manner, the light and heat sensitive recording layers of the light and heat sensitive recording material 12 are appropriately fixed for the heat-developed color images.

In the above-described embodiments, the heat-sensitive recording head is used as a heating device, but a far-infrared radiation heater may be used and a glaze portion is formed at the far-infrared radiation heater such that the thermal energy is applied.

(Light and Heat Sensitive Recording Material)

Next, the light and heat sensitive recording material used in image recording in the image recording device of the present invention will be described. The light and heat sensitive recording material used in the present invention is provided with light and heat sensitive recording layers (image recording layers) on a support. The light and heat sensitive recording layers form a latent image by being exposed with light, and the latent image is developed by heating to form an image. In addition to the light and heat sensitive recording layers, the light and heat sensitive recording material may also include other known layers, such as a protective layer, an intermediate layer, a UV absorbing layer, and the like, at any position thereof. Further, by the light and heat sensitive recording material used in the present invention being provided with, on a support, at least three light and heat sensitive recording layers which contain a yellow color forming component, a magenta color forming component and a cyan color forming component, respectively, the light and heat sensitive recording material can be used as a color light and heat sensitive recording material in color image formation. Further, if needed, a light and heat sensitive recording layer containing a black color forming component may be included.

The present invention can optimally use a light and heat sensitive recording material provided with (a) a light and heat sensitive recording layer containing heat-responsive microcapsules encapsulating a color forming component A, and at the outer side of the microcapsules, a photopolymerizable composition formed from at least a photopolymerization initiator and a substantially colorless compound B having in the same molecule a polymerizable group and a moiety which forms color by the reaction with the color forming component A; (b) a light and heat sensitive recording layer containing heat-responsive microcapsules encapsulating a color forming component A, and at the outer side of the microcapsules, a photopolymerizable composition formed from at least a substantially colorless compound C which forms color by the reaction with the color forming component A, a photopolymerizable compound D, and a photopolymerization initiator; (c) a light and heat sensitive recording layer containing heat-responsive microcapsules encapsulating a color forming component A, and at the outer side of the microcapsules, a photopolymerizable composition formed from at least a substantially colorless compound C which forms color by the reaction with the color forming component A, a photopolymerizable compound Dp having a moiety which suppresses the reaction between the color forming component A and the compound C, and a photopolymerization initiator; or (d) a light and heat sensitive recording layer containing heat-responsive microcapsules encapsulating a substantially colorless compound C which forms color by the reaction with the color forming component A, and at the outer side of the microcapsules, a photopolymerizable composition formed from at least the color forming component A, a photopolymerizable compound D, and a photopolymerization initiator.

In the light and heat sensitive recording layer (a), by effecting exposure in a desired image shape, the photopolymerizable composition which is outside of the microcapsules effects a polymerization reaction due to the radicals generated from the photopolymerization initiator, and hardens, such that a latent image of the desired image shape is formed. Next, due to heating, the compound B which exists in the unexposed portions migrates in the recording material and reacts with the color forming component A in the capsules such that color is formed. Accordingly, the light and heat sensitive recording layer (a) is a positive light and heat sensitive recording layer in which the exposed portions is not colored, and the portions at which the unexposed portions have not hardened form color to form an image. A specific example is the light and heat sensitive recording layer disclosed in Japanese Patent Application Laid-Open (JP-A) No. 3-87827 which contains, at the outside of the microcapsules, a compound having an electron accepting group and a polymerizable group in the same molecule, a photocurable composition containing a photopolymerization initiator, and an electron donating colorless dye encapsulated in microcapsules. In this light and heat sensitive recording layer, the photocurable composition at the outer side of the microcapsules hardens due to exposure such that a latent image is formed. Thereafter, the electron accepting compound existing within the unexposed portions moves into the recording material due to heating, and reacts with the electron donating colorless dye within the microcapsules such that color is formed. Accordingly, the hardened latent image portions of the exposed portions do not form color, and color is formed only at the portions which do not harden. A sharp positive image having high contrast can be formed.

In the above-described light and heat sensitive recording layer (b), by effecting exposure in a desired image shape, the photopolymerizable compound D is polymerized by radicals generated from the photopolymerization initiator which reacts by exposure with light, such that the film hardens and a latent image of the desired image shape is formed. The photopolymerizable compound D does not have a moiety which suppresses the reaction between the color forming component A and the compound C. Thus, upon heating, the compound C which exists in the unexposed portions migrate in the recording material, and reacts with the color forming component A within the capsules to form color. Accordingly, the light and heat sensitive recording layer (b) is a positive light and heat sensitive recording layer in which color is not formed at the exposed portions, and the uncured portions of the unexposed portions form color to form an image. A specific example is a light and heat sensitive recording layer containing an azomethine dye precursor encapsulated in microcapsules, a deblocking agent which generates an azomethine dye from the dye precursor, a photopolymerizable compound, and a photopolymerization initiator. In this light and heat sensitive recording layer, by exposure, the photopolymerizable compound at the outer side of the microcapsules polymerizes and is hardened such that a latent image is formed. Thereafter, upon heating, the deblocking agent existing at the unexposed portions migrate in the recording material, and reacts with the azomethine dye precursor within the microcapsules such that color is formed. Accordingly, the cured latent image portions of the exposed portions do not form color, and only the portions which are not hardened form color, such that a positive image is formed.

In the light and heat sensitive recording layer (c), by exposure with light in a desired image shape, the photopolymerizable compound Dp is polymerized by the radicals generated from the photopolymerization initiator which reacts by the exposure, such that the film is hardened, and a latent image of the desired image shape is formed. The photopolymerizable compound Dp has a moiety which suppresses the reaction between the color forming component A and the compound C. Thus, depending on the layer properties having the latent image therein (hardened portions) formed by exposure, the compound C migrates and reacts with the color forming component A within the capsules to form an image. Accordingly, the light and heat sensitive recording layer (c) is a negative light and heat sensitive recording layer in which the exposed portions form color such that an image is formed. A specific example is the light and heat sensitive recording layer disclosed in JP-A No. 4-211252 which contains, at the outside of the microcapsules, an electron accepting compound, a polymerizable vinyl monomer, and a polymerization initiator, as well as an electron donating colorless dye encapsulated within microcapsules. The mechanism of image formation in this light and heat sensitive recording layer is unclear, but is thought to be as follows. The vinyl monomer existing outside of the microcapsules is polymerized by exposure with light, and on the other hand, the electron accepting compound coexisting in the exposure portions is not taken-in at all into the formed polymer, and rather, the interaction thereof with the vinyl polymer is reduced so that the electron accepting compound exists in a state that the compound is mobile at a high diffusion rate. On the other hand, the electron accepting compound in the unexposed portions exists in a state that the compound is trapped by the coexisting vinyl polymer. Thus, upon heating, the electron accepting compound in the exposed portions preferentially migrates in the recording material, and reacts with the electron donating colorless dye within the microcapsules. The electron accepting compound at the unexposed portions does not pass through the capsule walls even if heated, and does not react with the electron donating colorless dye, and thus does not contribute to color formation. Accordingly, in this light and heat sensitive recording layer, an image is formed by the exposed portions forming color and the unexposed portions not forming color. Thus, a sharp negative image with high contrast can be formed.

In the light and heat sensitive recording layer (d), by effecting exposure in a desired image shape, the photopolymerizable compound D is polymerized by the radicals generated from the reacted photopolymerization initiator by exposure, and the film is cured such that a latent image of the desired image shape is formed. The photopolymerizable compound D does not have a moiety which suppresses reaction of the color forming component A with the compound C. Thus, upon heating, the color forming component A existing in the unexposed portions migrates in the recording material, and reacts with the compound C within the capsules to form color. Accordingly, the light and heat sensitive recording layer (d) is a positive light and heat sensitive recording layer in which an image is formed such that color is not formed in the exposed portions but is formed in the uncured portions in the unexposed portions.

Hereinafter, the structural components forming the light and heat sensitive recording layers (a) through (d) will be discussed. Examples of the color forming component A in the light and heat sensitive recording layers (a) through (d) are an electron donating colorless dye which is substantially colorless and a diazonium salt compound. For example, the electron donating colorless dyes disclosed in paragraphs [0051] through [0061] of Japanese Patent Application No. 11-36803 can be used as the electron donating colorless dye. For example, the diazonium salt compounds disclosed in paragraphs [0062] through [0077] of Japanese Patent Application No. 11-36803 can be used as the diazonium salt compound.

The substantially colorless compound B, which is used in the light and heat sensitive recording layer (a) and which has in the same molecule a polymerizable group and a moiety which forms color by the reaction with the color forming component A, may be any compound which has both functions of forming color by the reaction with the color forming component A and being polymerizable and curable by the reaction due to light, such as an electron accepting compound having a polymerizable group or a coupler compound having a polymerizable group. The electron accepting compound which has a polymerizable group, i.e., a compound having an electron accepting group and a polymerizable group in the same molecule, may be any compound which has a polymerizable group, and forms color by the reaction with an electron donating colorless dye which is one example of color forming component A, and which photopolymerizes such that the film thereof is hardened. For example, the electron accepting compounds disclosed in paragraphs [0079] through [0088] of Japanese Patent Application No. 11-36308 can be used as the electron accepting compound having a polymerizable group. Further, for example, the coupler compounds disclosed in paragraphs [0089] through [0105] of Japanese Patent Application No. 11-36308 can be used as the coupler compound having a polymerizable group.

In the light and heat sensitive recording layers (b) through (d), in place of the above-described compound B having a polymerizable group, the substantially colorless compound C which does not have a polymerizable group and which forms color by the reaction with color forming component A can be used as the compound which forms color by the reaction with the color forming component A. However, compound C does not have a polymerizable group, and is therefore used together with photopolymerizable compound D which does have a polymerizable group, because it is necessary to impart a film hardening effect due to photopolymerization to the recording layer. All electron accepting compounds or coupler compounds which do not have a polymerizable group can be used as the compound C. For example, the electron accepting compounds disclosed in paragraphs [0107] through [0111] of Japanese Patent Application No. 11-36308 can be used as the electron accepting compound which does not have a polymerizable group. For example, the coupler compounds disclosed in paragraphs [0117] through [0126] of Japanese Patent Application No. 11-36308 can be used as the coupler compound which does not have a polymerizable group.

A photopolymerizable monomer can be used as the photopolymerizable compound D. A photopolymerizable monomer having at least one vinyl group in the molecule can be used as the photopolymerizable monomer. Further, in a case in which a negative image is desired, the photopolymerizable compound Dp, which has a moiety which suppresses reaction of the color forming component A with the compound C, is used as the photopolymerizable compound. A photopolymerizable compound Dp which is appropriate in light of the compound C to be used, i.e., a specific photopolymerizable monomer (Dp1, Dp2), is selected and used as the photopolymerizable compound Dp. In a case in which an electron accepting compound which does not have a polymerizable group is used, it is used together with the specific photopolymerizable monomer Dp1. As the photopolymerizable monomer Dp1, it is preferable to use a photopolymerizable monomer which has the effect of suppressing the reaction between the electron donating colorless dye and the electron accepting compound, and which has at least one vinyl group in the molecule. For example, the photopolymerizable monomers disclosed in paragraphs [0112] through [0116] of Japanese Patent Application No. 11-36308 can be used as the photopolymerizable monomer Dp1. Further, in a case in which a coupler compound which does not have a polymerizable group is used, it is used together with the specific photopolymerizable monomer DP2. It is preferable that the photopolymerizable monomer Dp2 is a photopolymerizable monomer which is not a metal salt compound which has an acidic group having the effect of suppressing the coupling reaction. For example, the photopolymerizable monomers disclosed in paragraphs [0128] through [0131] of Japanese Patent Application No. 11-36308 can be used as the photopolymerizable monomer Dp2.

In the light and heat sensitive recording layers (b) through (d), an azomethine dye precursor may be used as the color forming component A, and a deblocking agent, which generates an azomethine dye (forms color) by contact with the azomethine dye precursor, may be used as the compound C. Further, a negative image can be obtained by using, as the photopolymerizable compound, a photopolymerizable compound (Dp) having a moiety which suppresses the reaction between the azomethine dye precursor and the deblocking agent. For example, the azomethine dye precursors disclosed in paragraphs [0028] through [0106] of Japanese Patent Application No. 2000-18425 can be used as the azomethine dye precursor. Further, the deblocking agents disclosed in paragraphs [0143] through [0164] of Japanese Patent Application No. 2000-18425 can be used as the deblocking agent. Moreover, in the light and heat sensitive recording layer (a), an azomethine dye precursor can be used as the color forming component A, and a deblocking agent having a polymerizable group can be used as the compound B. For example, the deblocking agents disclosed in paragraphs [0233] through [0238] of Japanese Patent Application No. 2000-18425 can be used as the deblocking agent having a polymerizable group.

The following combinations (i) through (xv) are examples of other combinations of the color forming component A and the compound B or the compound C which forms a color upon reaction with the color forming component A. In the following combinations, the components are listed in the order of the color forming component A, followed by the compound B or the compound C.

(i) A combination of an organic acid metal salt such as silver behenate or silver stearate; and reducing agents such as protocatechuic acid, spiroindane, hydroxyquinone.

(ii) A combination of a long chain fatty acid iron salt such as iron (III) stearate, iron (III) myristate; and phenols such as tannic acid, gallic acid, ammonium salicylate.

(iii) A combination of an organic acid heavy metal salt such as nickel, cobalt, lead, copper, iron, mercury, and silver salt of acetic acid, stearic acid, palmitic acid; and an alkaline earth metal sulfide such as calcium sulfide, strontium sulfide, potassium sulfide, or a combination of the organic acid heavy metal salt and an organic chelate agent such as s-diphenylcarbazide and diphenylcarbazone.

(iv) A combination of a heavy metal sulfate such as a sulfate of silver, lead, mercury, sodium; and a sulfur compound such as sodium tetrathionate, sodium thiosulfate, thiourea.

(v) A combination of a fatty acid iron (III) salt such as iron (III) stearate; and an aromatic polyhydroxy compound such as 3,4-hydroxytetraphenylmethane.

(vi) A combination of an organic metal salt such as oxalate and mercury oxalate; and an organic polyhydroxy compound such as polyhydroxy alcohol, glycerin, glycol.

(vii) A combination of a fatty acid iron (III) salt such as iron (III) pelargonate, iron (III) laurate; and a thiocetylcarbamide or isothiocetylcarbamide derivative.

(viii) A combination of an organic acid lead salt such as lead caproate, lead pelargonate, lead behenate; and a thiourea derivative such as ethylene thiourea, N-dodecyl thiourea.

(ix) A combination of a higher fatty acid heavy metal salt such as iron (III) stearate, copper stearate; and zinc dialkyldithiocarbaminate.

(x) An oxazine forming combination dye such as a combination of resorcinol and a nitroso compound.

(xi) A combination of a formazane compound and a reducing agent and/or a metal salt.

(xii) A combination of an oxidation type color forming agent and an oxidizing agent.

(xiii) A combination of a phthalonitrile and a diiminoisoindoline (a combination which formes phthalocyanine).

(xiv) A combination of isocyanates and diiminoisoindolines (a combination which forms a coloring pigment).

(xv) A combination of a pigment precursor and an acid or base (a combination which generates a pigment).

Among the above described combinations of color forming components, the following combinations are preferable: a combination of an electron donating dye precursor and an electron accepting compound; a combination of a diazo compound and a coupler compound; a combination of a protected dye precursor and a deblocking agent; and a combination of an oxidant precursor of a paraphenylenediamine derivative or a paraaminophenol derivative and a coupler compound. Namely, the color forming component A is preferably an electron donating dye precursor, a diazo compound, a protected dye precursor or an oxidant precursor, and the compound B or the compound C is preferably an electron accepting compound, a coupler compound or a deblocking agent.

Next, the photopolymerization initiator used in the light and heat sensitive recording layers (a) through (d) will be discussed. The photopolymerization initiator is used in any of the light and heat sensitive recording layers (a) through (d), and due to light exposure, generates radicals to cause a polymerization reaction within the layer, and promotes this reaction. Due to this polymerization reaction, the recording layer film is cured, and a latent image of a desired image shape can be formed. The polymerization initiator preferably contains a spectral sensitizing compound having a wavelength of maximum absorption in the range of 300 to 1000 nm, and a compound which has interaction with the spectral sensitizing compound. However, if the compound which has interaction with the spectral sensitizing compound is a compound which has, in the structure thereof, both functions of a borate moiety and a dye moiety having a wavelength of maximum absorption in a range of 300 to 1000 nm, it suffices not use the spectral sensitizing dye. In the case of forming a color image, it is suitable to use a light and heat sensitive recording material which has light and heat sensitive recording layers containing photopolymerization initiators which contain these compounds. For example, the photopolymerizable monomers disclosed in paragraphs [0133] through [0179] of Japanese Patent Application No. 11-36803 can be used as the photopolymerization initiator.

Other additives of the light and heat sensitive recording layers, layer structures other than the light and heat sensitive recording layers, and the microencapsulation methods disclosed in paragraphs [0180] through [0226] of Japanese Patent Application No. 11-36803 can be used with the above-described light and heat sensitive recording material.

In the present invention, in addition to the light and heat sensitive recording material having the above-described light and heat sensitive recording layers (a) through (d), a light and heat sensitive recording material can be used which is provided with the following photocurable light and heat sensitive recording layer whose irradiated portions are cured by being irradiated with light: (e) a light and heat sensitive recording layer containing an oxidant precursor E which is encapsulated in heat-responsive microcapsules, and outside of the heat-responsive microcapsules, an activating agent G which reacts with the oxidant precursor E to generate an oxidant F, and a dye forming coupler H which is involved in a coupling reaction with the oxidant F to form a dye; and (f) a light and heat sensitive recording layer containing the oxidant precursor E which is provided outside of heat-responsive microcapsules, and encapsulated within the microcapsules, an activating agent G which reacts with the oxidant precursor E to generate the oxidant F, and a dye forming coupler H which is involved in a coupling reaction with the oxidant F to form a dye.

When the light and heat sensitive recording layer (e), is exposed in a desired image shape, the portions irradiated with light are cured such that a latent image of the desired image shape is formed. Then, upon heating, the activating agent G present in the unexposed portions migarate in the recording material and reacts with the oxidant precursor E within the capsules to generate the oxidant F. The generated oxidant F undergoes in a coupling reaction with the dye forming coupler H to form a dye (form color). Accordingly, the light and heat sensitive recording layer (e) is a positive light and heat sensitive recording layer in which the exposed portions do not form a color and the uncured portions of the unexposed portions form color so as to form an image. A specific example is the light and heat sensitive recording layer disclosed in Japanese Patent Application No. 11-324548 which contains a dye forming coupler and an oxidant precursor of a paraphenylenediamine derivative or a paraaminophenol derivative encapsulated in microcapsules, and an activating agent which is outside the microcapsules, and reacts with the oxidant precursor to generate an oxidant of a paraphenylenediamine derivative or a paraaminophenol derivative, a photopolymerizable monomer, and a photopolymerization initiator. In this light and heat sensitive recording layer, upon exposure, the photopolymerizable monomer polymerizes and is hardened to form a latent image. Thereafter, upon heating, the activating agent present in the unexposed portions migrates in the recording material, and reacts with the oxidant precursor (oxidation product) of the paraphenylenediamine derivative or the paraaminophenol derivative in the microcapsules, such that an oxidant of the paraphenylenediamine derivative or the paraaminophenol derivative, which is a color forming developing agent within the microcapsules, is formed. This oxidant of the color forming developing agent reacts with the dye forming coupler in the microcapsules to form a color. Accordingly, the cured latent image portions in the exposed portions do not form color, and only the portions which are not cured form color, such that a sharp positive image having high contrast can be formed.

When the light and heat sensitive recording layer (f), is exposed in a desired image shape, the portions irradiated with light is cured such that a latent image of the desired image shape is formed. Then, upon heating, the oxidant precursor E present in the unexposed portions migrates in the recording material and reacts with the activating agent G within the capsules to form the oxidant F. The generated oxidant F undergoes coupling reaction with the dye forming coupler H to form a dye (form color). Accordingly, the light and heat sensitive recording layer (f) is a positive light and heat sensitive recording layer in which the exposed portions do not form a color and the uncured portions in the unexposed portions form color so as to form an image. A specific example is the light and heat sensitive recording layer disclosed in Japanese Patent Application No. 11-324548 which contains, an oxidant precursor of a paraphenylenediamine derivative or a paraaminophenol derivative which is present outside the microcapsules, and an activating agent which is encapsulated within the microcapsules, and reacts with the oxidant precursor to generate an oxidant of a paraphenylenediamine derivative or a paraaminophenol derivative, and a dye forming coupler, a photopolymerizable monomer, and a photopolymerization initiator. In this light and heat sensitive recording layer, upon exposure, the photopolymerizable monomer polymerizes and hardens, and a latent image is formed. Thereafter, upon heating, the oxidant precursor of the paraphenylenediamine derivative or the paraaminophenol derivative present in the unexposed portions migrates in the recording material and reacts with the activating agent within the microcapsules. An oxidant of the paraphenylenediamine derivative or the paraaminophenol derivative, which is a color forming developing agent within the microcapsules, is generated. This oxidant of the color forming developing agent reacts with the dye forming coupler in the microcapsules to form a color. Accordingly, the hardened latent image portions in the exposed portions are colored, and only the portions which are not hardened form color, such that a sharp positive image having high contrast can be obtained.

Hereinafter, the structural components of the light and heat sensitive recording layers (e), (f) will be discussed. The oxidant F which is generated in the light and heat sensitive recording layers (e), (f) is an oxidant (oxidation product) of a color forming developing agent. For example, the compounds disclosed in paragraphs [0009] through [0024] of Japanese Patent Application No. 11-324548 can be used as the oxidant precursor E. For example, the compounds disclosed in paragraphs [0024] through [0032] of Japanese Patent Application No. 11-324548 can be used as the activating agent G. Further, for example, the compounds disclosed in paragraph [0033] of Japanese Patent Application No. 11-324548 can be used as the dye forming coupler H.

In the same way as with the light and heat sensitive recording layers (b) through (d), by adding the photopolymerizable compound D and a photopolymerization initiator to the light and heat sensitive recording layers (e), (f), a photocurable light and heat sensitive recording layer can be obtained. Further, a photocurable light and heat sensitive recording layer can be formed in such a manner that one of the oxidant precursor E, the activating agent G and the dye forming coupler H has a polymerizable group. Further, by using the photopolymerizable compound Dp, which has a high interactivity with one of the oxidant F and the dye forming coupler H, as the photopolymerizable compound, a negative image can be obtained. The same photopolymerizable compounds D and photopolymerization initiators as used in the light and heat sensitive recording layers (b) through (d) can be used.

Other additives for the light and heat sensitive recording layers, layer structures other than the light and heat sensitive recording layers, and the microencapsulation methods disclosed in paragraphs [0180] through [0226] of Japanese Patent Application No. 11-36803 can be used with the above-described light and heat sensitive recording layers, in the same way as with the light and heat sensitive recording layers (a) through (d).

As described above, according to the present invention, light used for recording a latent image in an optical recording device is guided to a photo-fixing position by a guide device, and then photo-fixing can be carried out. Thus, without providing a new light source for photo-fixing, a single light source can be used both for optical recording and for photo-fixing.

What is claimed is:

1. A device for recording an image on a light and heat sensitive recording material, the device comprising:

a light source which irradiates light when operated;

a light separator which receives light irradiated from the light source, separates the light by color and irradiates color separated light towards the light and heat sensitive recording material to form a latent image on the recording material;

a heat device for heating the light and heat sensitive recording material to form a developed image on the recording material image by developing the latent image; and a guide disposed for receiving light irradiated from the light source and which directs unseparated light towards the light and heat sensitive recording material to photo-fix the developed image.

2. The device of claim 1, wherein the light propagates along a path of travel between the light source and the light separator, and the guide comprises a reflector member movable to a position disposed in the optical path, and to a position not disposed in the optical path.

3. The device of claim 1, further comprising an exposure controller operable for selectively controlling exposure of light irradiated onto the light and heat sensitive recording material disposed at a predefined location in the device.

4. The device of claim 3, wherein said exposure controller is operable for controlling an exposure amount of light on light and heat sensitive recording material in accordance with an exposure pattern.

5. The device of claim 4, wherein said exposure controller comprises a plurality of small areas which are individually controllable for transmission and blocking of light.

6. The device of claim 5, wherein said exposure controller comprises a shutter array, with the small areas arranged two-dimensionally and each small area including a shutter.

7. The device of claim 5, wherein said exposure controller comprises a micromirror array including controllable reflecting angles.

8. The device of claim 3, wherein said light separator and said exposure controller are provided integrally with one another.

9. The device of claim 1, wherein said light separator comprises red, green, and blue (R, G, B) filters for selectively separating R, G and B light.

10. The device of claim 9, wherein said light separator comprises a cylindrical shape including a circumferential surface with the filters for the respective colors provided on the circumferential surface and due to rotation of the light separator, colors are selectively separated from light received from the light source.

11. A device for recording an image on a light and heat sensitive recording material, wherein the light and heat sensitive recording material includes layers sensitive to light color hues different from other layers, the device comprising:

a light source which irradiates light comprising a mixture of color hues when operated;

optical recording apparatus including a light separator which separates light received from the light source into light consisting essentially of color hues corresponding to the light and heat sensitive recording layers, and which records a latent image on the light and heat sensitive recording material with the separated light;

a heat developer which subjects the light and heat sensitive recording material to heating to form a developed image on the light and heat sensitive recording material by developing the latent image; and fixing apparatus including a guide member which guides unseparated light from the light source towards the light and heat sensitive recording material to photo-fix the developed image.

12. The device of claim 11, wherein said guide member comprises a reflecting member provided at a side of the light source from which light is irradiated, the reflecting member being operable for directing light irradiated from the light source between from one direction to another, wherein one direction is for recording an image, and the other direction is for photo-fixing.

13. The device of claim 11, wherein at least a portion of said guide member is movable to a position inserted in an optical path between said light source and said light separator.

14. The device of claim 13, wherein during photo-fixing, said at least a portion of said guide member is inserted in the optical path between said light source and said light separator.

15. The device of claim 11 wherein said light separator comprises an exposure amount controller provided to the side of said light source from which light is irradiated, and controls an exposure amount of separated light for recording the latent image.

16. An image recording method comprising the steps of:

color separating light irradiated from a light source and then irradiating the light onto a light and heat sensitive recording material to thereby form a latent image on the light and heat sensitive recording material;

heating said light and heat sensitive recording material to thereby form a developed image from the latent image;

directing unseparated light from said light source with a guide onto the developed image to thereby photo-fix the developed image.

17. The image recording method of claim 16, further comprising the step of adjusting an irradiation amount of color separated light during said step of color separating.

18. The image recording method of claim 16, further comprising the step of setting a light amount of said light source to an amount suitable for photo-fixing the developed image.

19. The image recording method of claim 16, wherein said guide comprises reflecting member, and the step of directing unseparated light includes using the reflecting member to reflect unseparated light from the light source towards the developed image.

20. The image recording method of claim 16, wherein said guide is operated to direct unseparated light from the light source only when photo-fixing the developed image.

21. A device for recording an image on a light and heat sensitive recording material, the device comprising:

a conveyor operable for conveying light and heat sensitive recording material to at least two different positions;

a light source which irradiates light when operated;

a light separator which receives light irradiated from the light source, separates the light by color and irradiates color separated light towards the light and heat sensitive recording material when disposed at a first one of the positions to form a latent image on the light and heat sensitive recording material;

a heat device for heating the light and heat sensitive recording material to form a developed image on the recording material image from the latent image; and a guide disposed for receiving light irradiated from the light source and directing the light towards the light and heat sensitive recording material when disposed at a second one of the positions to photo-fix the developed image.

* * * * *